(12) United States Patent
Soar

(10) Patent No.: US 8,853,891 B2
(45) Date of Patent: Oct. 7, 2014

(54) INDUCTIVE BODY ARMOR

(75) Inventor: Roger J. Soar, Kelowna (CA)

(73) Assignee: Cynetic Design Ltd., KeLowna (CA)

(*) Notice: Subject to any disclaimer, the term of this patent is extended or adjusted under 35 U.S.C. 154(b) by 688 days.

(21) Appl. No.: 13/137,227

(22) Filed: Jul. 29, 2011

(65) Prior Publication Data

US 2012/0153740 A1 Jun. 21, 2012

Related U.S. Application Data

(60) Provisional application No. 61/344,637, filed on Sep. 3, 2010.

(51) Int. Cl.
| | |
|---|---|
| *H01F 27/42* | (2006.01) |
| *H02J 5/00* | (2006.01) |
| *F41H 1/02* | (2006.01) |
| *F41H 5/04* | (2006.01) |
| *A41D 13/015* | (2006.01) |
| *H04B 5/00* | (2006.01) |

(52) U.S. Cl.
CPC .............. *H02J 5/005* (2013.01); *A41D 13/015* (2013.01); *H04B 5/0037* (2013.01); *F41H 1/02* (2013.01); *F41H 5/0428* (2013.01)
USPC ........................................................ 307/104

(58) Field of Classification Search
USPC .............................................. 307/104; 2/2.5
See application file for complete search history.

(56) References Cited

U.S. PATENT DOCUMENTS

| | | | | |
|---|---|---|---|---|
| 8,502,506 | B2* | 8/2013 | McElroy et al. | 320/136 |
| 2002/0145849 | A1* | 10/2002 | Peterson, III | 361/683 |
| 2008/0235841 | A1* | 10/2008 | McDunn et al. | 2/2.5 |
| 2010/0115680 | A1* | 5/2010 | Thomas et al. | 2/2.5 |
| 2011/0173731 | A1* | 7/2011 | McElroy et al. | 2/2.5 |
| 2013/0043888 | A1* | 2/2013 | Soar | 324/655 |

* cited by examiner

*Primary Examiner* — Jared Fureman
*Assistant Examiner* — Duc M Pham
(74) *Attorney, Agent, or Firm* — Antony C. Edwards

(57) ABSTRACT

A system for the inductive transmission of power from a primary coil to a secondary coil and its associated secondary circuits, and for the inductive transmission of data between the primary and secondary coils includes a hard body-armor plate mountable in a tactical garment wherein at least one primary coil is embedded in the plate behind the plate's strike-face by a substantially uniform said first depth, and wherein the primary circuits of the primary coil are adapted to be electrically connected to a central power source carried on or in cooperation with said garment, and at least one device pocket is provided for an electronic hand-held device wherein said device pocket is mountable to an outer surface of said garment so as to be in an inductively coupling position aligned over said primary coil in said plate to thereby align said secondary coil of a hand-held device in the device pocket over and into inductively coupled registry with said primary coil in the plate.

21 Claims, 10 Drawing Sheets

INDUCTIVE BODY ARMOR

CROSS REFERENCE TO RELATED APPLICATION

This application claims priority from U.S. Provisional Patent Application No. 61/344,637 filed Sep. 3, 2010 entitled Ceramic Body Armor with Inductive Charging and Inductive Data Transfer Locations.

FIELD OF THE INVENTION

This invention relates to the field of tactical body-armor, and in particular to body armor employing at least one hard armor plate wherein power and data are transferred between at least one primary coil mounted behind the strike-face of the plate and a secondary coil in a hand held device mounted in a device pocket on the armor adjacent the strike-face.

BACKGROUND OF THE INVENTION

Soldiers have always carried a significant load when on patrol or in battle. In the recent past the load was carried in large marching packs, smaller day packs and their immediate fighting order on a load carriage vest. This vest contained all the immediate ammunition, grenades, flashlight, water, first aid and other essential smaller equipment that a soldier is required to have immediately at hand. More recently the modern soldier wears ballistic protection or body armour vest that also functions as a load carriage or tactical vest. This vest may now carry a multitude of electronic equipment such as inter and intra-squad radios, GPS, flashlight, electronic displays, keypads and computer interface devices.

With the advent of the future soldier, this electronic burden has become an even greater contributor of the overall fighting order load and has created a considerable logistic burden with respect to the battery management of all the electronic devices the soldier is carrying. The battery burden can easily be 3-6 different battery types that in conjunction with spares weigh as much as 4 kg for a 24 hour mission. A significant logistic issue is not only the physical weight of the batteries, but the fact that soldiers are prone to replacing their electronic device batteries whenever they think the ones installed are not sufficiently fresh. As the devices rarely have a battery energy gauge, studies have found soldiers typically throw away up to 70% of the energy they have been carrying. This is extremely expensive power that is thrown away from both the perspective of the soldier who carried it but never used it and the logistic replenishment support cost. In addition soldiers do not know what batteries to take on a mission as different devices use their own type of battery and the use of equipment will change with the tactical scenario. Frequently a soldier may not be re-supplied within the expected time frame.

A favoured option in future soldier vest designs is the use of a central power system using larger high capacity batteries, that power an integrated power and data harness. Power is fed to various nodes on the garment to supply the electronic devices carried by the soldier with power and data via quick-connect connectors. Data is also required to provide a Central Power Management (CPM) capability. The various devices are interrogated by the CPM as to their state of charge and are charged according to priority and amount of central power remaining. As central power is lost, the CPM can start removing lower priority devices from the power, saving the power for the high priority devices.

The use of cables and providing power and data connections to a soldiers equipment is a considerable problem as the cables snag, connectors break and are subject to damage by the environment. It is also very difficult to connect equipment with gloved hands in an expeditious fashion when the equipment is then to be stowed in pockets, during for example an intense tactical situation such as a fire fight.

In addition to the above equipment power and data issues, the soldiers in a unit are assigned different roles, are provided with different electronic devices, each of which may be required to be used at different intervals and require being placed in different locations on the load carriage vest. The reconfiguration problem is compounded by the fact that all the electronic and non electronic devices and equipment require their own specialized pockets as the size and shapes of objects carried has a large range. Further each soldier may have different personal preferences or may be assigned a new role which require his equipment to be reconfigured. For example the position of various devices on a vest will change depending on if the soldier shoots form the left or right shoulder. Many existing soldier systems cannot accommodate soldiers that shoot using the left shoulder because the pockets cannot be reconfigured. To meet the challenge of fighting order and load carriage equipment reconfiguration, most militaries have designed and now use a load bearing equipment such as a load carriage vest, tactical vest, tactical pants and other garments that allow the pockets to be moved around or reconfigured to a very considerable extent.

I hereby incorporate by reference my U.S. patent application Ser. No. 11/922,788 (Publication No. 20090218884) entitled "Contactless Battery Charging Apparel". The application describes sequential power transmission between a central power source carried on a soldier or person that is distributed through a wiring harness or conductive fabric worn on the soldier to inductive nodes located at various locations on torso of the soldier. The fixed position inductive power transfer nodes allow the transfer of power to rechargeable batteries in electronic devices distributed on the soldier without having physical contact or wires between the soldier and the components. The inductively coupled primary and secondary coils allow the transfer of power based on air core transformer theory.

I also incorporate by reference my U.S. patent application Ser. No. 12/923,895 (Publication Number US 2011-0031928-A1) entitled "Soldier System Wireless Power and Data Transmission". The application describes the use of inductive power and data transmission on a soldier system providing improved power management through the use of a central battery, power management system, inductively charged hand electronic devices containing rechargeable batteries. So that the devices can be truly wireless without any power or data cables connecting them to the soldier, the application also describes the use of inductive data transmission between the devices and the soldier system that could use Near Field Communication as a platform.

All devices connected to the power and data harness can be independently controlled by the central power management system. The design of the garment may not allow for a central power management system or the need for the exchange of power management data. In this case the modular pockets primary circuit for each device works autonomously drawing power to charge its respective device as needed until the central power source, such as a larger capacity battery or fuel cell is depleted. When a central power supply is changed out, it can be hot swapped as all the distributed electronic devices remain powered by their own internal battery.

PRIOR ART PUBLICATIONS

1. Standard ECMA-340, Near Field Communication Interface and Protocol-1 (NFCIP-1), 2nd Edition December 2004
2. Standard ECMA-352, Near Field. Communication Interface and Protocol-2 (NFCIP-2), 2nd Edition June 2010
3. Standard ECMA-386 Cryptographic Standard Cryptography Standard using ECDH and AES (NFC-SEC-01) 2nd Edition, June 2010
4. H.264/MPEG-4 Audio Video Conversion, Wikipedia
5. Specification "Qi Compliant Wireless Power Transmitter Manager bq500110", Texas Instruments Inc, Dallas, Tex. Publication: SLUSAE0A November 2010, Revised April 2011
6. Specification "Wireless Receiver-Side Communication and Power Monitoring IC for Wireless Power MSP430BQ 1010", Tex. Instruments Inc, Dallas, Tex. Publication: SLAS696, December 2010
7. PN5331B3HN, Near Field Communication (NFC) Controller. Document #157531, Rev 3.1, NXP B.V., Dec. 10, 2008
8. AN10682-2 PN533 Application Note, Rev. 1.3, NXP B.V. Nov. 14, 2008

PATENT AND PATENT APPLICATIONS

1. U.S. Pat. No. 7,863,859 issued Jan. 4, 2011 to Soar, entitled Contactless Wireless Battery Charging Apparel
2. U.S. Pub No. US-2011-0089894-A1 for the application of Soar, application no. U.S. Ser. No. 12/926,858 published Apr. 21, 2011 entitled Contactless Wireless Battery Charging Apparel
3. U.S. Pub No. US-2009-0218884 for the application of Soar, application Ser. No. 11/922,788 published Sep. 3, 2009 entitled Contactless Wireless Battery Charging Apparel.
4. U.S. patent application Ser. No. 12/923,895 (Publication Number US 2011-0031928-A1) for the application of Soar entitled "Soldier System Wireless Power and Data Transmission".

| 5.  | 7,254,366 B2    | August 2007   | Palermo  |
|-----|-----------------|---------------|----------|
| 6.  | 7,408,324 B2    | August 2008   | Baarman  |
| 7.  | 7,149,552 B2    | December 2006 | Lair     |
| 8.  | 7,076,206 B2    | July 2006     | Elferich |
| 9.  | 6,924,619 B2    | August 2005   | Dvorak   |
| 10. | 2006/0224048 A1 | October 2006  | Devaul   |
| 11. | 7,805,767 B2    | October 2010  | McElroy  |
| 12. | 7,657,255 B2    | February 2010 | Abel     |
| 13. | 7,254,366 B2    | August 2007   | Palermo  |
| 14. | 7,149,552 B2    | December 2006 | Lair     |
| 15. | 200810129215    | Jun. 5, 2008  | Boys     |

SUMMARY OF THE INVENTION

In a further embodiment of inductive power and data transfer technology, instead of for example a modular pocket containing the primary coil and drive circuit where the modular pocket is mounted onto a tactical garment, a multiple of the primary coil and drive circuits or inductive nodes are located on the hard armour plate worn by the soldier. Inductive power passes from the primary coil(s) on the hard armour plate, through a protective covering on the plate and through various layers of fabric equivalent to an air gap between 1-10 mm, to either permanently fixed pocket(s) or modular pocket(s) located proximal to the hard armor primary coils on the plate pocket of the tactical garment or load carriage garment, or plate carrier (herein collectively referred to as a tactical garment). The pockets hold the electronic hand-held device to be charged and are configured so the device receives wireless inductive power and data from a primary coil and drive circuit on the hard armor plate when the device is placed into the device pocket.

A hard armour plate may have either a single inductive power and data node or multiple inductive power and data nodes placed upon its strike face. Any hard armour plate can have the inductive nodes incorporated into it including front, rear and side plates or other hard composite armour protective element. The significant advantages this provides is that power and data on the soldier system can be simplified with a single hard wired connection to each plate, versus providing separate power and data cables to multiple locations. The user is free to take any device and place it on an inductive node location on the armor plate pocket cover, where it will receive power and data as required. Each inductive node operates independently and will recognise the type of device placed upon it, the level of charge required and provide communication data to the device. There are multiple configurations this design could be implemented in. Each inductive node may function independently drawing power from a central power source as required, or they may be controlled by a central power management system that controls each of the nodes. The layout of nodes can vary by plate size and anticipated requirement.

Two principle configurations of this invention have been identified:

A) Hard Armour Plate Connected to Central Power Source and Data Network

A hard armor plate with integrated inductive driving circuit(s) that has one or more inductive primary power and data coils or nodes placed upon its strike face. Electrical power is provided to the plate via a dis-connectable power and data cable that is a part of the vests soldier system data network and central power system, which could include a central power source (battery or fuel cell etc) and a power management system.

B) Hard Armour Plate with Integrated Conformal Battery

A hard armor plate with integrated inductive driving circuit(s) that has one or more inductive primary power and data coils placed upon its strike face and has integrated into the backing of the plate a rechargeable battery that conforms to the general shape of the plate. The integrated rechargeable plate battery can provide power directly to the inductive coils located on the front side of the plate without any external wiring. The integrated battery on the hard armor plate may receive supplemental power from, or provide power to other power sources or power sinks carried by the soldier. Data can be provided from a standalone plate back to the soldier system data network using an inductive wireless data link.

One characteristic of this invention is that the armour plate, which is carried in the vests plate pocket, is the outer most component of a soldiers tactical or load carriage vest, with the load carriage modular pockets attached directly onto the plate pocket cover. This ensures that the inductive power transfer will be optimised due to the proximity of the primary coils on the front surface (strike face) of the armor plate and the secondary coils within the devices placed into the modular pockets attached to the front of the plate pocket.

Nearly every modern soldier or marine in the militaries of the world are equipped with a protective armor vest that is comprised of soft armor and hard armor panels. Tactical or Armor vests come in many forms, shapes, designs, functions and levels of ballistic or fragmentation protection as required by the many different roles of the soldiers wearing them. Typical examples of vests currently issued are the Interceptor Body Armour Vest (US Army), Improved Outer Tactical Vest (USMC), the CF Fragmentation Vest (Canada) and Osprey Body Armour Vest and Osprey Assault Body Armour Vest (UK). In addition to complete tactical vests sometimes only a plate carrier system is used such as the Soldier Plate Carrier System (SPCS). In general, whether the vest is modular or an integrated system, it consists of an outer carrier, soft armor panels, ballistic plates, and attachments that increase the area of protective coverage. Other features may include padded shoulders, quick doff cable release, wrap-to-front design for a secure fit with easy donning, man-down drag strap, wire channel buttonholes, and Modular Lightweight Load-carrying Equipment (MOLLE) or PALS webbing for securing mission-essential equipment using modular pockets. The soft armor panels occupy a large area of the vest and are flexible so as to provide as little resistance to motion and provide as much comfort as possible given their protective function. The soft panels are designed to protect against fragmentation and low velocity ballistic threats. Soft armour vests usually have large front and rear pockets into which hard armour plates can be inserted, with more recently the use of hard side plates. The hard armour plates are designed to protect against high velocity threats such as AK47, APM2, and other high velocity ballistic threats with a hard core center.

Hard armor plate construction falls into two principle groups: plates constructed with a ceramic strike face and composite backing and plates made only of composite. The ceramic strike face can be a single monolithic piece or a matrix of ceramic tiles placed onto the composite: backing. Ceramics used include, but are not limited too: $Al_2O_3$ (Aluminum Oxide or Alumina); SiC (Silicon Carbide); $Si_3N_4$ (Silicon Nitride); and, $B_4C$ (Boron Carbide).

Composite materials may be used by themselves as a standalone body armor system or be a part of a composite-ceramic armor system when higher ballistic performance is required. Typical composites used are UHMWP or Ultra High Molecular Weight Polyethylene. Examples of this family of product would be Tensylon (™ BEA), Dyneema (™ DSM) or Spectra Shield (™ Honeywell). Para-Aramids and resin where the aramid would typically be a variety of weaves of Kevlar (™ DuPont), Twaron (™ Teijin), Technora (™ Teijin) or unidirectional laminates such as T-Flex (™ Armorworks LLC).

A variety of other materials may be added to the construction of the armor plate such as polycarbonate, thin layers of steel, carbon fiber, foams and various other materials that may provide an improvement in ballistic performance or to the plates general ruggedness. Hard armour plates come in different sizes to fit the user group and different shapes such as single curve, multi curve, chamfered corners, rifle cut outs or rounded anthropometric shapes.

As militaries continue to reduce the soldiers burden, armour and especially hard armour plates have come under critical scrutiny as they are one of the heaviest single components carried by a soldier. One weight reduction technique that is being examined is the integration of two requirements or pieces of equipment into one. Two of the many propositions that have been identified and that have been seriously looked at include the integration of computers or batteries into the back of hard armour plates. In applicant's opinion the most likely integration to succeed and the one that has seen prototype development (BAE Systems among others) is the incorporation of a conformal battery as either a part of the backing for the ceramic strike face of the armor plate. The typical capacity of an integrated battery would be 80-150 Whr or the equivalent of 25-30 AA batteries.

To recap this summary, in a preferred embodiment of the present invention a personal protective hard armour plate having integrated inductive power and data nodes is placed into the plate pocket of a tactical garment or plate carrier (herein collectively referred to as a "garment").

A multiple of the primary inductive power and data nodes can be located on a hard armour plate worn by the soldier. Inductive power and data would be able to pass from the primary coil(s) on the hard armour plate, through a protective covering on the plate and through various layers of fabric equivalent to an air gap between 1-10 mm, to either permanently fixed pocket(s) or modular pocket(s) located proximal to the hard armor primary coils on the plate pocket of the tactical or load carriage garment, or plate carrier.

The pockets would hold the electronic device to be charged and would be configured so the device receives wireless inductive power and data from a primary coil and drive circuit on the hard armor plate when the device is placed into the pocket.

Any hard armour plate can have integrated power and data inductive nodes including front, rear and side plates, with either a single inductive power and data node or multiple inductive power and data nodes placed upon its strike face.

The plate can be fitted into a conventional plate pocket on a soft armour vest. The plate pocket of the garment is fitted with either fixed pockets or has provision to attach removable modular external pockets for the carriage of electronic devices that would require wireless charging and/or transmission/reception of data.

Power and data on the soldier system exchange is simplified with a single hard wired connection to each plate with multiple power and communication nodes versus providing power and data cables to multiple separate locations.

When multiple nodes are integrated onto the plate a common bus for both power and data connects the nodes to a single quick connection point located on the edge of the plate. It may be found desirable that instead of fixing the plate connector to the edge of the plate, the connector can be placed on a wire pigtail that can exit the plate at any point.

The layout of nodes can vary by plate size and anticipated requirement.

A characteristic of this invention is that the armour plate, which is carried in the vests plate pocket, is the outer most component of a soldiers tactical or load carriage vest, with the load carriage modular pockets attached directly onto the plate pocket cover. This ensures that the inductive power transfer will be optimised due to the proximity of the primary coils on the front surface (strike face) of the armor plate and the secondary coils within the devices placed into the modular pockets attached to the front of the plate pocket.

Power

Each inductive node may function independently drawing power from a central power source as required, or they may be controlled by a central power management system that controls each of the nodes.

When a central power supply is changed out, it can be hot swapped as all the distributed electronic devices remain powered by their own internal battery.

The basic elements of each inductive node are the primary power and data driver circuit, the planar primary power coil assembly with optional proximity sensor used to detect the placement of a device within a pocket and the inductive data coils or antennas.

The charge of the device battery is monitored and fed back as a modulated data signal inductively through the primary-secondary inductive power link, or is provided back to the primary circuit through the inductive data circuit. In either event the power level of the device battery can be determined by the soldier system power management system and depending on power levels of the central power system and a devices tactical priority, the power to the primary inductive power circuit can be remotely turned on or off as required by the power management system.

System

Two principle configurations of this invention have been identified:

A) Hard Armour Plate Connected to Central Power Source and Data Network

A hard armor plate with integrated inductive driving circuit(s) that has one or more inductive primary power and data coils or nodes placed upon its strike face. Electrical power is provided to the plate via a dis-connectable power and data cable that is a part of the vests soldier system data network and central power system, which could include a central power source (battery or fuel cell etc) and a power management system.

B) Hard Armour Plate with Integrated Conformal Battery

A hard armor plate with integrated inductive driving circuit(s) that has one or more inductive primary power and data coils placed upon its strike face and has integrated into the backing of the plate a rechargeable battery that conforms to the general shape of the plate. The integrated rechargeable plate battery can provide power directly to the inductive coils located on the front side of the plate without any external wiring. The integrated battery on the hard armor plate may receive supplemental power from, or provide power to other power sources or power sinks carried by the soldier. Data can be provided from a standalone plate back to the soldier system data network using an inductive wireless data link.

The primary inductive resonant tank circuit can be pre-tuned to an anticipated air gap so as to obtain optimal power transfer efficiencies between the primary and secondary inductive power coils. The resonant characteristics of the primary tank circuit for a given frequency is influenced however by the mutual inductance between the primary and secondary coils and will change as the air gap between the primary and secondary coil is changed by a few millimeters.

Electronics

The incorporation of a microprocessor interface in each of the primary and secondary drive circuits allows low rate inductively transferred data to be exchanged using the primary power coil and providing wireless monitoring of the batteries charge status.

The secondary circuit provides rectification of the AC power signal, voltage regulation as required and power to an intelligent charging circuit. The secondary charging circuit interfaces to the secondary microprocessor which can drive the inductive transmission of the charge status of the battery back to the primary side and to the CPMS.

The primary circuit in the pocket can sense the proximity of a secondary device through such means as a proximity sensor, A second example is that the primary coil data circuit would 'ping' on a regular basis and wait for a data response back from the secondary circuit.

The geometry of the coil determines the shape of ferrite that would be used, the type of ferrite material used is determined by the resonant frequency of the tank circuit. The ferrite can be of a simple round planar design or utilise more complex geometries (ovals, rectangles et. cetera) to accommodate the location of the secondary coil within a device. The ferrite can be of many profiles such as a bar, channel, angle or more complex shapes.

Magnetic

For a soldier system, magnetic flux inductive data transmission offers the advantage that it can perform short range data exchange without a wired or physical connection. Inductive coupling has excellent material penetration capabilities penetrating non-magnetic materials such as air, water, body tissue, fabric, soft armour panels and plastic.

Coil geometry for the primary is a 2D antenna and a 3D orthogonal array or antenna for the secondary inductive data coil within the device allowing the device to be held in any orientation without losing inductive coupling with the primary inductive data antenna preferably optimised for signal reception between the transmitting and receiving coils when they are in any orientation relative to each other.

Inductive communication applies the principles of a modulating magnetic field therefore on body devices would be able to communicate between themselves and to the soldier system when the soldier enters an area or zone that is being subjected to RF jamming, where the RF jamming is being used to provide protection from the detonation of for example roadside IED's (Improvised Explosive Device) or for other tactical reasons.

Data

Inductive data signals received by the antennas are passed to the device data receiver/transmitter circuit and then to the device electronics while communicating in a peer to peer mode with the primary data circuit and the soldier system.

One method of creating a secure inductive data link, a desirable soldier system requirement, is to utilise Near Field Communication (NFC) technology which uses an inductively coupled coils or antennas to enable connectivity between electronic devices. NFC technology is a magnetic induction interface operating at a frequency of 13.56 MHz with standardized commercial data rates up to 848 kbps and more recently 6.78 Mbps.

The short range attributes of inductive data transmission or NFC also makes it very difficult to intercept by someone trying to eavesdrop as is easily the case with on body short range communication using Bluetooth, Zigbee or WiFi radio frequency technologies.

The existing NFC standards and product utilise the principle of encoded ASK (amplitude shift keying) inductive load modulation that provides data transmission rates up to 848 Kbits/s. A second modulation technique using PSK (phase shift keying), which is currently unsupported by the NFC standard, allows data rates of up to 6.78 Mbit/s.

Inductive communication applies the principles of a modulating magnetic field therefore on body devices would be able to communicate between themselves and to the soldier system when the soldier enters an area or zone that is being subjected to RF jamming, where the RF jamming is being used to provide protection from the detonation of for example roadside IED's (Improvised Explosive Device) or for other tactical reasons NFC communication protocols require the instant pairing of devices such that once they are brought within a very short range of each other such as <10 cm, they instantly pair without manual intervention. The moment a hand held device is placed in a modular pocket secured to the outside of an armor plate pocket, it will automatically connect to the primary power and data node on the armor plate and through to the soldier system.

NFC Allows 128 and 196 Bit Encrypted Data Transmission

In summary, one aspect of the present specification may be characterized as a system for the inductive transmission of power from a primary coil and its associated primary circuits to a secondary coil and its associated secondary circuits, and for the inductive transmission of data between the primary and secondary coils and their associated circuits, wherein the primary coil and associated primary circuits are mounted in cooperation with a tactical garment having a hard body-armor plate, where the system includes:

hard body-armor plate having a strike-face and an opposite rear face and which is non-magnetic, and non-electrically conductive to at least a first depth behind said strike-face, and wherein said plate is mountable to or into said garment so that, when so mounted, said strike-face faces away from a user wearing said garment and said rear face faces towards the user wearing said garment, wherein said primary circuits are mounted embedded in said plate, and wherein said primary coil is embedded in said plate behind said strike-face a substantially uniform said first depth, and wherein primary circuits are adapted to be electrically connected to a central power source carried on or in cooperation with said garment, a device pocket for an electronic hand-held device wherein said device pocket is mountable to an outer surface of said garment so as to be in an inductively coupling position aligned over said primary coil in said plate to thereby align said secondary coil of said hand-held device, when in said device pocket, over and into inductively coupled registry with said primary coil and wherein said pocket maintains said secondary coil at a substantially uniform second distance off said outer surface of said garment, and wherein the sum of said first depth and said second distance is an air-gap equivalent in the range of substantially one to ten millimeters for the inductively coupled transfer of power and data across said air-gap equivalent.

In one embodiment each primary coil is a single coil for both said transfer of power and data. In another embodiment each primary coil is a pair of coils wherein one coil of said pair is for said transfer of power and the other coil of said pair is for said transfer of data.

In a preferred embodiment a plurality of primary coils are distributed over said strike-face of the plate, where each primary coil is electrically connected in cooperation with its primary circuits.

Preferably also, each device pocket, as there is preferably a plurality of device pockets, is adapted and sized to snugly receive a corresponding hand held device therein for secure positioning of said secondary coil in its inductively coupling position.

The preferred tactical garment includes a plate pocket for receiving the plate on at least a front of the garment. Preferably there is a plurality of primary coils across the strike-face and the plurality of device pockets are mountable across the outer surface of said plate pocket.

In one embodiment of the system a central power supply mounted either said garment in electrical connection to said primary circuits, or on said plate in electrical connection to said primary circuits. In the latter, the central power supply may be a conformally shaped battery shaped so as to substantially conform to said rear surface of said plate.

In another embodiment a soldier system electrical network is provided on said garment wherein said plate has a hard-wired connection to said soldier system network for the exchange of power and data between said plate and said network. The network may include a common network bus, a processor and a central power supply. The plate may include a common plate bus embedded in said plate and connecting said plurality of primary coils and said primary circuits to said hard-wired connection to the network. Advantageously the central power supply is a central battery, and said processor communicates with said primary circuits and is adapted to provide power management for the controlled transfer of power to said hand-held devices when in said device pockets, so that as a charge of said central battery depletes, power is only transferred to the hand held devices having a higher tactical priority as determined by said processor. Further advantageously, each hand-held device has its own re-chargeable power supply which is charged by said inductive transfer of power thereby providing for hot swapping out of said central power supply without power interruption to each hand-held device when in said device pockets.

Preferably each hand-held device provides a modulated signal via said inductive coupling of said primary and secondary coils indicating the corresponding charge level of a corresponding rechargeable power supply in the hand-held device. The signal may be transmitted via a modulated signal inductively transmitted through an inductively coupled power coupling of said primary and secondary coils, or the signal may be transmitted via a modulated signal inductively transmitted through an inductively coupled data coupling of said primary and secondary coils.

DETAILED DESCRIPTION

Overview

In what follows both singular and plural language i.e. single and multiple coil and driver circuit terminology, is used interchangeably and is not intended to be limiting.

Figure 2:
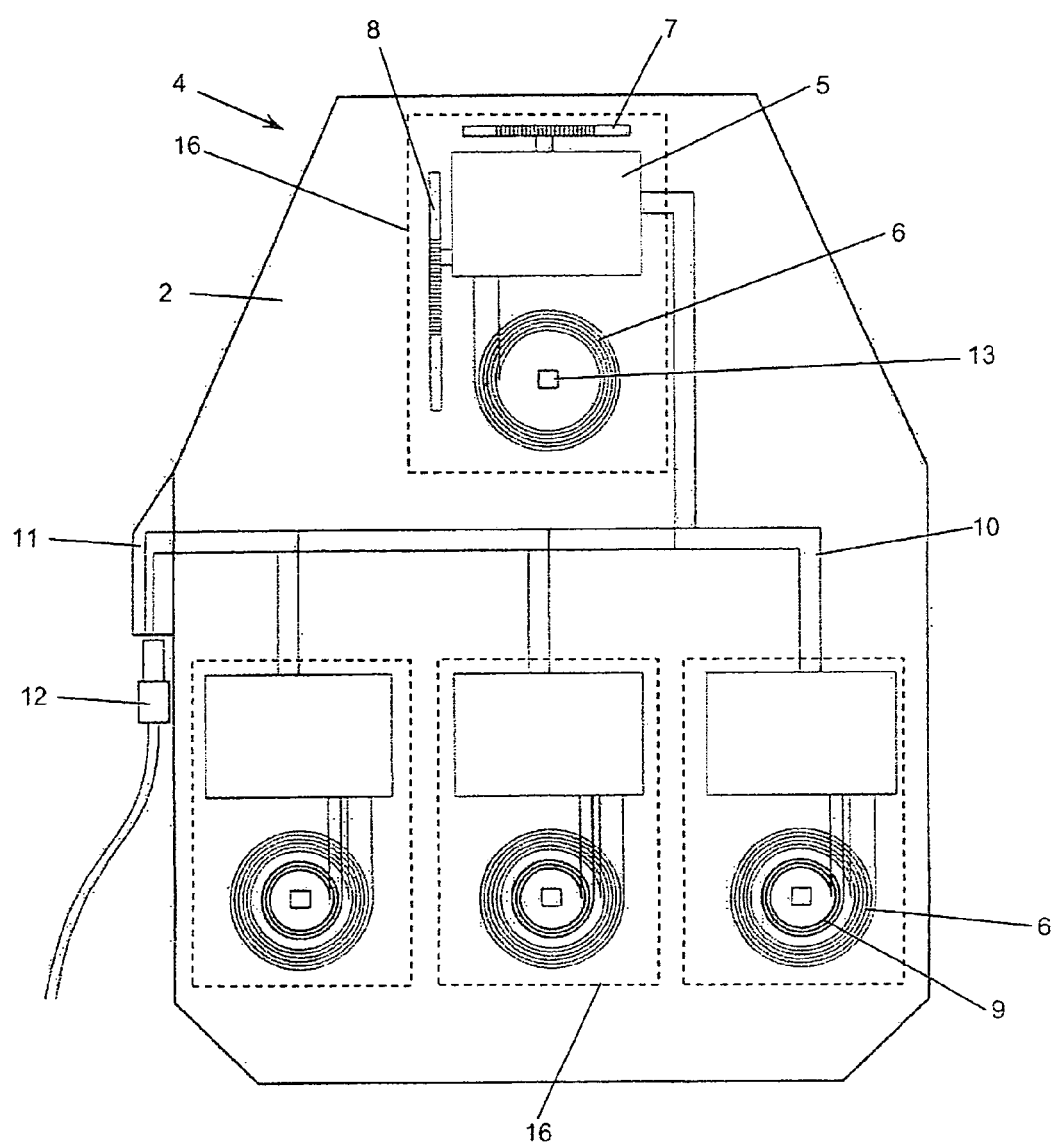
FIG. 2 shows a hard armour plate with an example layout of integrated inductive primary power and data nodes, and a single power and data connector to the soldier system. The plate can be fitted into a conventional plate pocket on a soft armour vest.
Figure 4B:
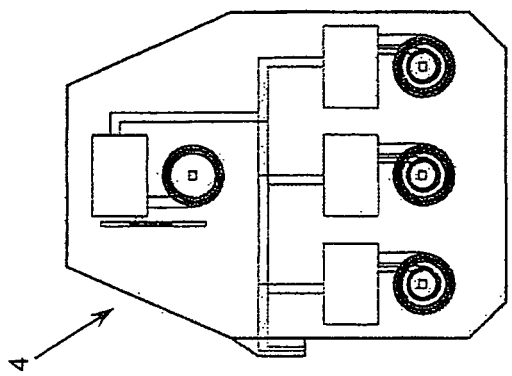
FIG. 4B shows the plate which fits into the hard armor plate pocket of FIG. 4A, and illustrates the inductive power and data nodes on the front of the vest.

The present invention involves in one aspect the placement of a personal protective hard armour plate with integrated inductive power and data nodes into the plate pocket of a tactical garment or plate carrier (FIG. 4). The plate pocket of the garment is fitted with either fixed pockets or has provision to attach removable modular external pockets for the carriage of electronic devices that would require wireless charging and/or transmission/reception of data. No fundamental design change is required to the base garment as all of the inductive charging technology is resident on the integrated hard armour plate. The hard armour plate may have multiple wireless primary inductive power and data nodes on the outside or strike face of the plate (FIG. 2). When powered by an AC voltage from the primary inductive drive circuit, an alternating current is induced in the primary power coil generating a magnetic flux that allows the primary coil to inductively couple to a secondary coil located in an electronic device that is placed in an outside load carriage pocket. Once an inductively coupled connection is made between the primary and secondary coils, a device that is connected to the secondary coil and its power conditioning circuit will instantly start to receive charging power for the devices internal rechargeable batteries. Inductive data transmission also uses a magnetic field to provide wireless communication. The primary inductive data coil or antenna is provided with an encoded and modulated data stream from a primary data drive circuit that is passed inductively to the secondary inductive data coil and data processor embedded within the electronic device.

Figure 3:
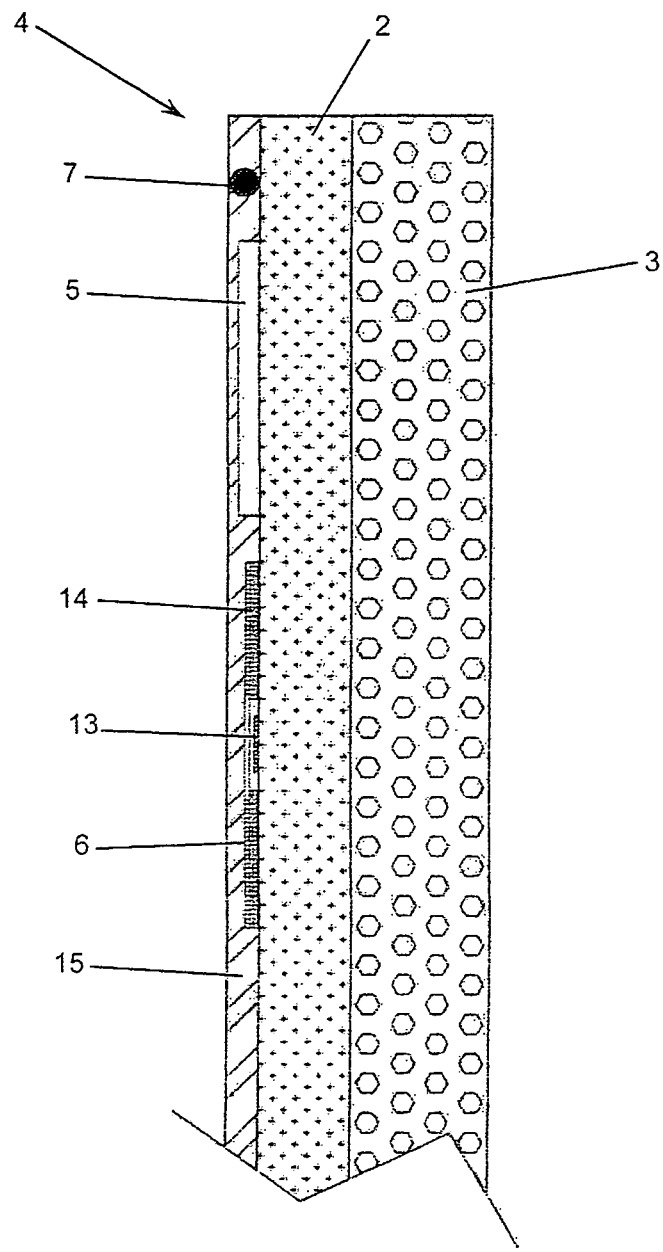
FIG. 3 shows a cross section of the top of a hard armor plate showing the main component blocks of an inductive primary power and data node embedded in a resin layer on the strike face of the plate. Not shown to provide clarity is the nylon fabric or plastic plate cover.

The primary power and data inductive coils, would be placed on the front or strike side of the hard armour plate, which with the primary drive circuits located alongside, would form a primary inductive power and data node. Alternatively, if the coils are sufficiently large, the drive circuit can be placed inside the coil, or in a third iteration on the back side of the plate. Due to the small size of the component parts versus a hard armor plate, it can be seen that numerous arrangements are possible. In the future as components are made smaller and thinner, the primary coil and primary drive circuit may even be stacked without unduly compromising the thickness of the hard armour plate. The primary coils and drive can be designed to be thin i.e. <2 mm, to keep any additive thickness to the hard armor plate as low as possible (FIG. 3).

Figure 5:
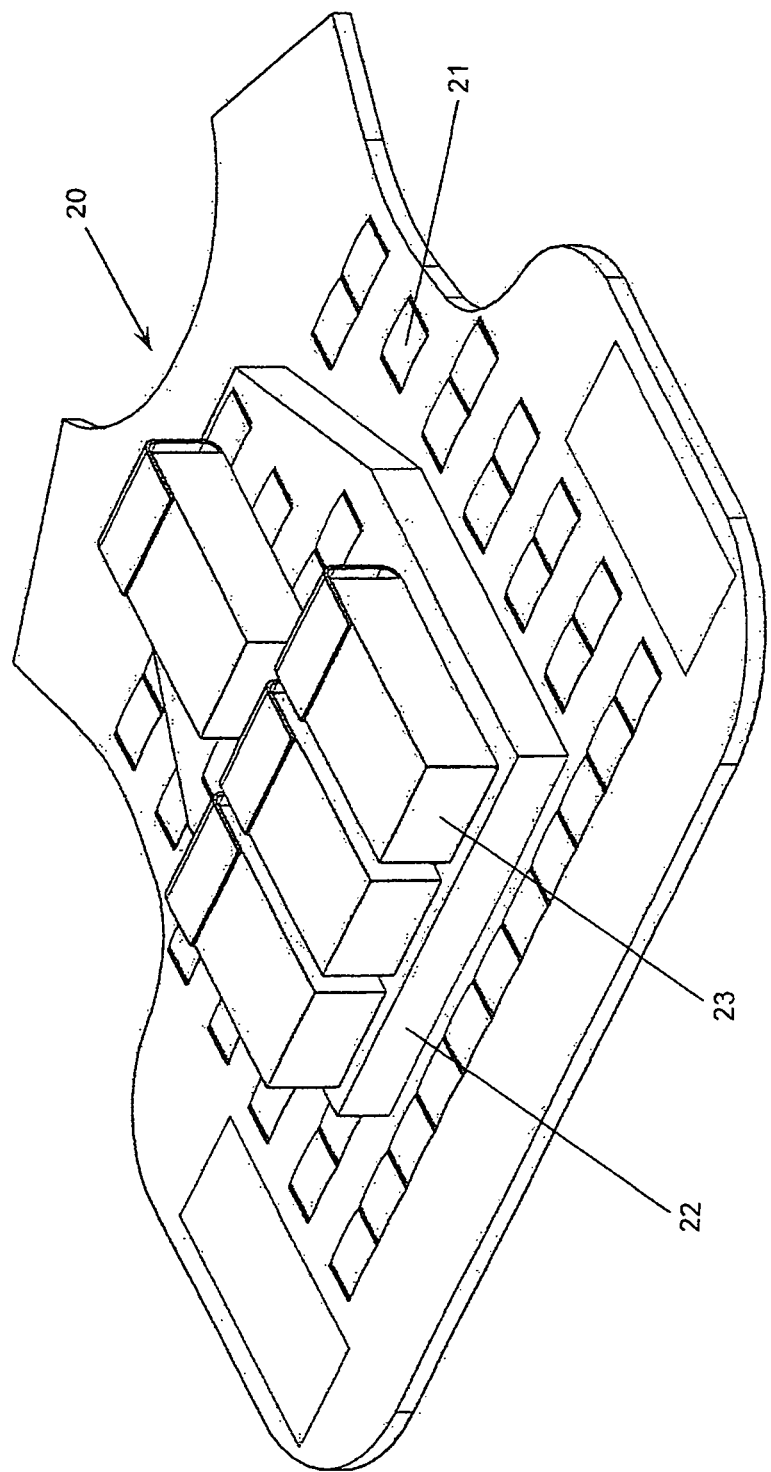
FIG. 5 shows a perspective view of a tactical load carriage vest showing the plate pocket on the outside of the outer carrier, with modular pockets attached to the plate pocket using MOLLE or PALS webbing attachment method.

A modular pocket is attached to a tactical or load carriage vest to allows the user flexibility in the placement of the devices, equipment and ammunition, etc, that he may require while on a mission (FIG. 5). The pocket can be attached to a vest using any of the typical methods used for detachable or modular pocket purposes including quick release fasteners. Attachment methods would include but not be limited to basket weave webbing or Pockets Attachment Ladders System (PALS) and hook and loop fastener tape with or without snap fasteners, clips such as the ALICE system and buckles etc.

Modular pockets attached using the PALS or other detachable designs can be fastened to the hard armour plate pocket in any configuration that suits the user and his mission. For an electronic device to be inductively charged however, the primary charging nodes on the plate must be aligned co-axially with the secondary inductive power coils of the device placed within the pocket.

The modular pocket can hold any of many electronic devices carried by a soldier or civilian. Typical military devices would be GPS, tactical radio(s), flashlight, CW Sensors, tactical computer, smart phone, target designator, still and video camera, UAV controller, rechargeable battery, card reader, keyboard and other such portable devices.

The pocket may be of any form factor and could be designed to fit the device (FIG. 7) it is intended to carry or may be of a generic general utility size. The pocket may have an elasticized inner component through which the device is placed and allows the device to be held securely in place against the back of the pocket to enhance proximity to the primary coil. This will be especially of benefit when devices are placed into powered utility pouch versus a device specific pocket. The pocket can be constructed from soft or hard materials such as fabric, moulded foams, hard and soft plastics and other materials. Frequently, the pocket is made from similar materials to that of the vest it is attached too. The pocket may have a means of closure to hold the contents secure. The closure can be a flap that is fastened with hook and loop fastener, snaps, buckles etc or it may be other means for holding the pocket contents in place such as webbing, elastic strap, quick release buckle etc.

If the weight of the attached devices is such that the front cover of the plate pocket is pulled away from the surface of the plate, which would reduce the inductive charging efficiency by increasing the air gap between the primary and secondary inductive coils, a strap, elastic or other tightening method can be employed that holds the cover fabric in closer contact with the strike surface of the plate.

Figure 6:
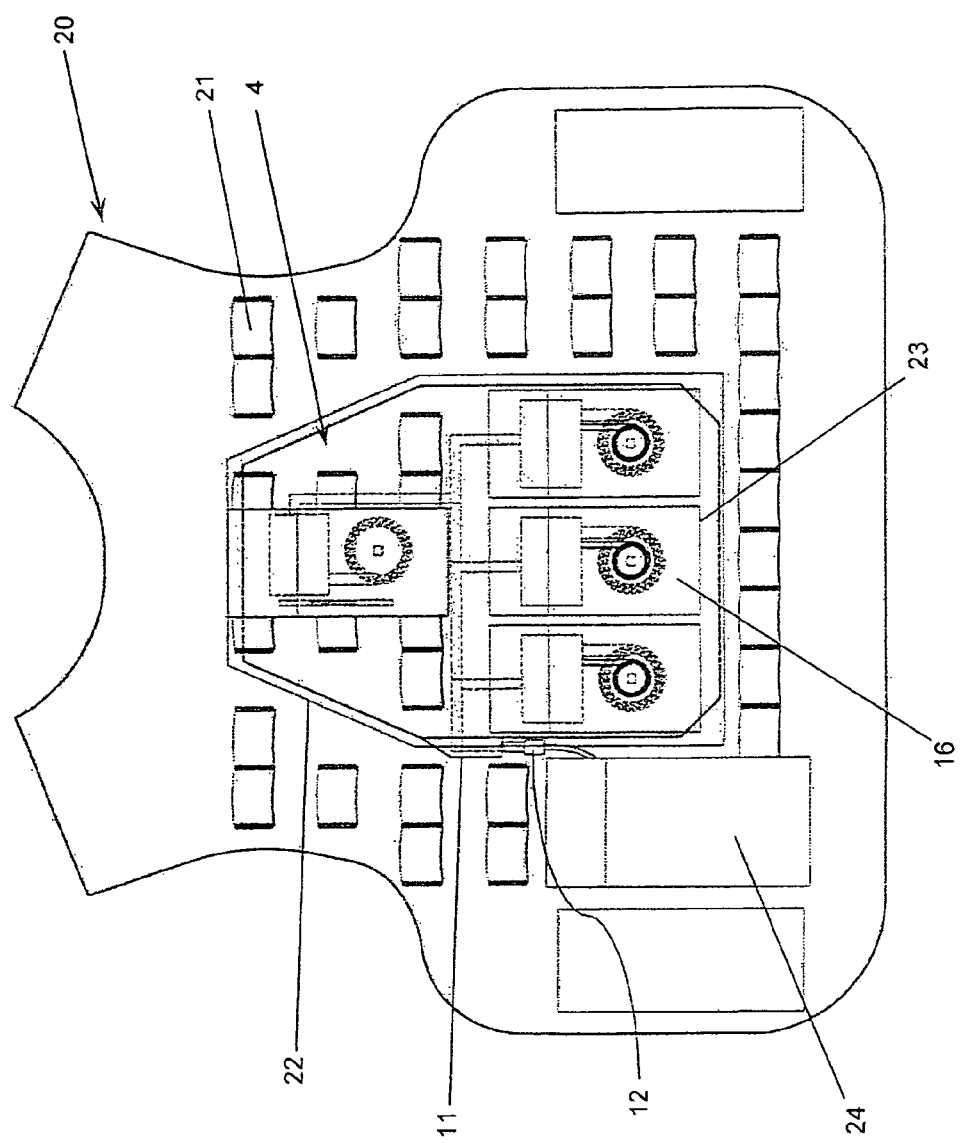
FIG. 6 shows the hard armour plate with integrated inductive power and data nodes inserted into the plate pocket of a soft armour vest. The plate is connected to a central battery power supply pocket and the soldier data bus. Modular pockets attached to the hard armor plate pocket are aligned over the inductive power coil to obtain maximum power transfer efficiency.

Inductive transfer of power and data to devices stowed in pockets introduces several benefits to a soldier system. There is a reduction in the conventional heavy power and data wires between the inductive power and data nodes and the soldier system, as only one cable is needed to provide the multiple nodes on the plate with power and data exchange capability. This provides both a weight savings and an increase in system integrity as there is a reduction in physical connection points and flexible cabling which are both prone to failure (FIG. 6). If desired the plate can be provided with an integrated battery that allows either a stand alone power supply to the primary charging nodes or a central power supply that is simply supplemented through a power manager from another power source.

Figure 9:
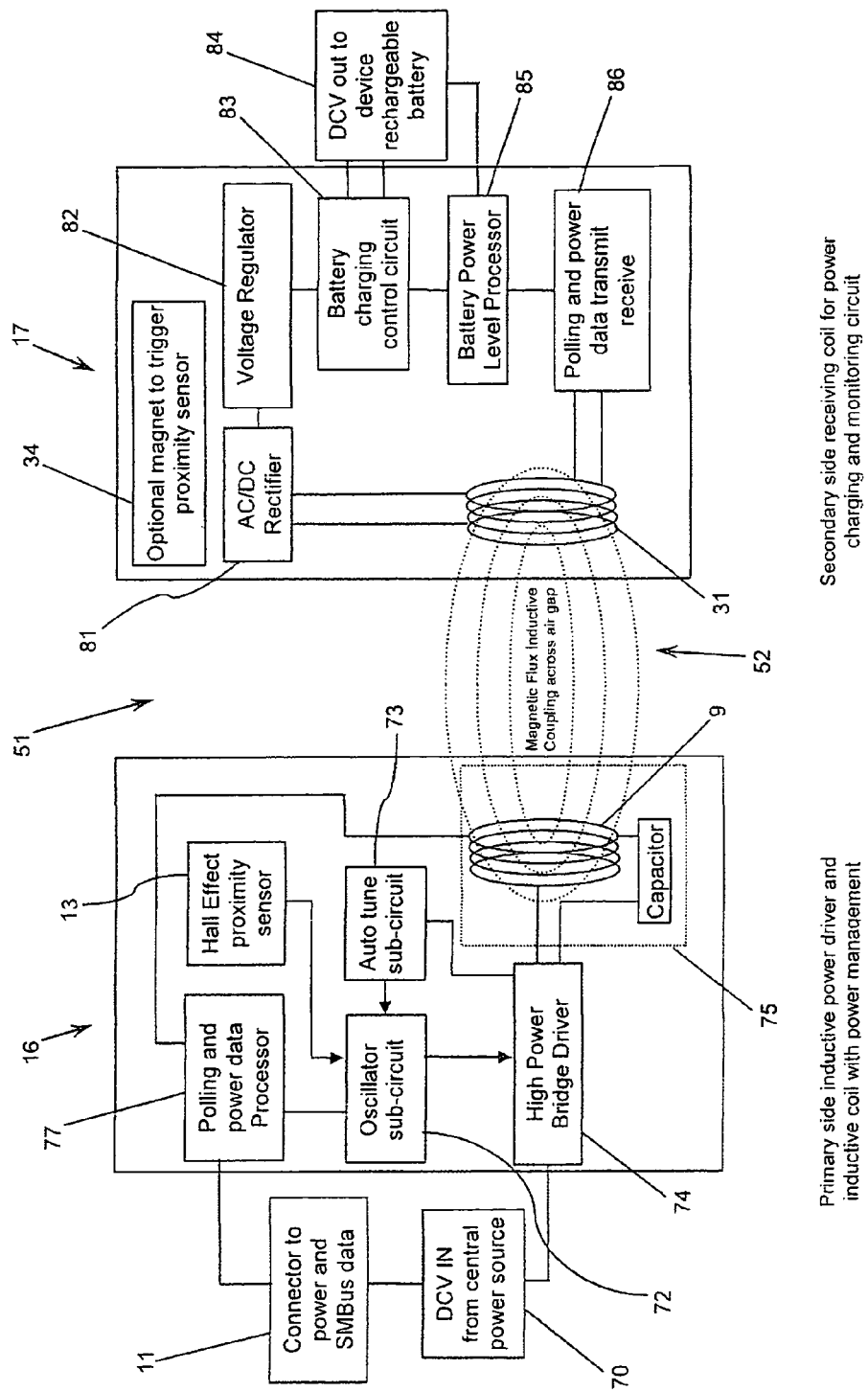
FIG. 9 show a simplified schematic block diagram showing inductive power and low level data transfer such as battery charge management using a single coil on each of the primary and secondary sides.

The basic function of the primary inductive power circuit is to take a DC voltage and convert it into a high frequency AC voltage that drives an LC resonant tank circuit containing the primary inductive drive coil. The primary coil on the armor plate and secondary coil within the device form an air core transformer and are inductively coupled by the AC magnetic flux from the primary coil, allowing the transfer of power between the armor plate and the device without a wired connection. The primary inductive drive side circuit blocks would typically include but not be limited too a frequency generating or oscillator circuit, power switching driver(s) such as a MOSFET full or half bridge driver that in turn would power the LC resonant tank circuit placing a current through the primary inductive power coil. Base power for the primary circuit would be provided via the main DC power bus of the soldier system, from a central power device such as a battery, fuel cell or power management/distribution system or alternately a battery incorporated into the hard armor plate. FIG. 9 is a diagram of the basic electronic building blocks for a single primary coil power and data inductive charging system, FIG. 10 a diagram of the basic electronic building blocks when the inductive power transmission uses a separate inductive coil pair from the data transmission antennas.

The primary inductive resonant tank circuit can be pre-tuned to an anticipated air gap so as to obtain optimal power transfer efficiencies between the primary and secondary inductive power coils. The resonant characteristics of the primary tank circuit for a given frequency is influenced however by the mutual inductance between the primary and secondary coils and will change as the air gap between the primary and secondary coil is changed by a few millimeters. An improved circuit is to employ an auto-tune sub-circuit integral to the primary coil drive to autonomously monitor and adjust the resonant frequency and maintain power transfer efficiency.

Typical resonant frequencies for the inductive power circuit range from 100-500 khz, but certain applications may require operation up into the 10's of MHz.

The incorporation of a microprocessor interface in each of the primary and secondary drive circuits allows low rate inductively transferred data to be exchanged using the primary power coil and providing wireless monitoring of the batteries charge status. The microprocessor in the primary circuit also allows communication with the central power management system (CPMS) via an interface such as the SMBus or I$^2$C Bus interface. The CPMS can control the distribution of power from the central power source to the inductive nodes allowing the CPMS to selectively control which devices receive power.

The secondary inductive power circuit is co-located with the secondary charging coil. Depending on the design of the device, the secondary circuit and coil can be internal to the device, or if the device has an external removable battery, such as a walkie talkie, the secondary inductive power circuit and coil can be integrated into the external battery. The secondary circuit provides rectification of the AC power signal, voltage regulation as required and power to an intelligent charging circuit. Rectification, the conversion of received AC power signal to a DC power signal can be by diode bridge, synchronous rectification techniques or other means. The secondary charging circuit interfaces to the secondary microprocessor which can drive the inductive transmission of the charge status of the battery back to the primary side and to the CPMS. The secondary coil has the same construction options as the primary coil, and can be made in many configurations and out of many different conductive materials. Typically the secondary charging circuit would be for a Li Ion or Lithium Polymer battery, but any present or future battery or supercapacitor technology could be charged with the appropriate interface circuit.

Typically to conserve power and keep overall system efficiency as high as possible the primary side of the inductive charging system is in a very low power, sleep mode when it is not activated to charge the secondary side. The primary circuit in the pocket can sense the proximity of a secondary device through such means as a proximity sensor, eg a hall effect sensor at which time a handshake protocol is initiated to determine the charge status of the energy storage component within the device and if charging should commence. Instead of a hardware device being used as the secondary circuit proximity detector the primary power circuit can be used to poll or ping for the presence of a secondary circuit. Several circuit implementation options are available. One is that the primary LC auto tune circuit looks for a change in the inductance of the primary coil. As the secondary coil is brought into proximity with the primary, the mutual inductance between the coils changes the inductive value of the primary coil, resulting in a change to the LC resonant frequency. This can be detected by the auto-tune circuit of the primary coil. A second example is that the primary coil data circuit would 'ping' on a regular basis and wait for a data response back from the secondary circuit. One method of implementing this process has been described by Texas Instruments Inc, in their inductive charging IC specification listed above and incorporated herein by reference. As stated therein: "There are two ways the coupled electromagnetic field can be manipulated to achieve information transfer from the secondary side to the primary side. With resistive modulation approach, the communication resistor periodically loads the rectifier output changing the system Q factor and as a result value of the voltage on the primary side coil. With capacitive modulation approach, a pair of communication capacitors are periodically connected to the receiver coil network. These extra capacitance application changes slightly the resonance frequency of the system and its response on the current operating frequency, which in turn leads to coil voltage variation on the primary side. With both modulation techniques primary side coil voltage variations are detected with demodulation circuitry and further interpreted to restore the content of the information packets and adjust controls to the transmitter schematic."

The primary coil assembly with ferrite backing as stated above would be of a low profile design (i.e. <2 mm) such as a planar or pancake geometry, where the coil would be of a diameter that is considerably greater than the thickness of the coil. Coil size and geometry will for the most part be dictated by the size, shape and internal configuration of the electronic device. An example coil geometry for a hand held device may have an inside diameter of 30 mm, outside diameter of 45 mm and a thickness of 2 mm including the ferrite backing. This coil geometry would allow a matching primary coil configuration to be bonded without difficulty to the front of the ceramic strike face. The coil could be constructed in many configurations that are found on the market today for inductive coupled devices or new designs that provide inductive coupling for the purpose of power and data transfer. Existing coils can be wire wound using conventional enameled copper magnet wire, multi-filament Litz wire, coil designs etched into single, double sided or multi-layer printed circuit boards; single, double sided or multi-layer flexible substrates such as Mylar™ or Kapton™ etc and be of any geometric shape to suit packaging formats determined by the device profile or node arrangement on the armor plate. Coils with a Q-factor from very low to greater than 100 can be used as the coil orientation is primarily fixed and therefore can accommodate a variety of coil designs and 'Q'. The higher the Q however, the better coupled the coils and overall system efficiency will be higher or more optimised.

Wherever possible the primary and secondary inductive power coils would be designed to have universal compatibility with devices of different size and shape, however in some circumstances it may be beneficial to have the size or shape of the primary and secondary coils specifically matched to a device.

The mechanism of power transfer within this application is based upon primary and secondary coils that are inductively coupled across an air gap, or that form an air core transformer. The primary and secondary coils may be air backed or to optimise the inductive wireless power transfer efficiency between the primary and secondary coils, different shapes and thickness of ferrite backing can be employed to direct or create a more efficient path for the magnet flux (FIG. 8). The geometry of the coil determines the shape of ferrite that would be used, the type of ferrite material used is determined by the resonant frequency of the tank circuit. The ferrite can be of a simple round planar design or utilise more complex geometries (ovals, rectangles et cetera) to accommodate the location of the secondary coil within a device. The ferrite can be of many profiles such as a bar, channel, angle or more complex shapes. In some circumstances, the application of a high permeability material such as Mu metal may be used behind the coils for shielding purposes.

If the hard armour plate is designed with an integrated battery, the plate may still be fitted with a quick connect cable socket that allows it to be connected to the main soldier system. The cable would allow the possibility of providing supplemental power to or from the soldier system and the plate. The cable would allow the transfer of power management data so that the central power management system knows the charge status of devices being carried in the pockets or the transfer of communications data such as text and video from the inductive data coils located on each node.

With the inductive secondary power and data circuit contained within the electronic device, the device can now be semi-permanently sealed and ruggedized. It also allows the inductive power and data transfer enabled devices be full submersed in water, and be impervious to exposure to ice, snow, mud, dust, dirt, sand, etc as well as battlefield petroleum, oils and lubricants (POL's).

For a soldier system, magnetic flux inductive data transmission offers the advantage that it can perform short range data exchange without a wired or physical connection. Inductive coupling has excellent material penetration capabilities penetrating non-magnetic materials such as air, water, body tissue, fabric, soft armour panels and plastic. As 'daily use' power and data cables or connectors are now not required, exposed electrical contacts on the device can be semi-permanently sealed and the device ruggedized. This enables inductive power and data transfer enabled devices to be full submersed in water, and be impervious to exposure to ice, snow, mud, dust, dirt, sand, et cetera as well as battlefield petroleum, oils and lubricants (POL's).

Inductive transmit and receive coils separated by an air gap may be thought of as a weakly-coupled transformer, across which data may be transmitted by modulating the source (or transmitter) and detecting the modulated signal at the receiver. Typical frequencies in the low frequency range for the inductively coupled data transmission are between 100-500 kHz and can be used for low baud data rate of up to 9.6 kbps, and in the high frequency range 13.56 MHz is used when high baud rate data transmission of up to 848 kbps are required. The US Army has identified required data rates of between 9.6 kbps for physiological status monitors to 256 kbps for weapon ballistics computation. It has been determined that high quality audio transmissions can be made with data rates of 30-40 kbps.

One method of creating a secure inductive data link, a desirable soldier system requirement, is to utilise Near Field Communication (NFC) technology which uses an inductively coupled coils or antennas to enable connectivity between electronic devices. NFC technology is a magnetic induction interface operating at a frequency of 13.56 MHz with standardized commercial data rates up to 848 kbps and more recently 6.78 Mbps. The technology has been developed to transfer secure data on a peer to peer basis between two co-located cell phones, between cell phones and data terminals for retail sale transactions, or between cameras and other electronics such as TVs or media players.

Inductive data transfer as with inductive power transfer also employs vicinity inductive coupling within near field or more specifically the radian sphere. The magnetic flux of a typical inductive data circuit with a central operating frequency of 13.56 MHz has a wavelength of 22 m. Inductive coupling for practical data transmission purposes occurs no further than the near field—far field transition or radian sphere which is approximately defined as $\lambda/2\pi$ (lambda/(2× pi)) or for 13.56 MHz a theoretical maximum range of 3.5 m. In practice, because of the very low power levels utilised and because the magnetic field attenuates at a rate following the inverse cube law, a practical low power independent handheld device has a range limit of about one meter. This is unlike inductive power transfer requirements, which for efficient power transfer must have less than 1 cm of separation between the primary and secondary power coils. It should be understood that the proximity estimates for maximum data transfer (less than one meter) and for power transfer (0-1 cm) are not intended to limit, as with optimization of antenna design, location, sensitivity of the transmitter/receiver circuits, et cetera, these distances may upon further development be increased. The short range attributes of inductive or NFC also makes it very difficult to intercept by someone trying to eavesdrop as is easily the case with on body short range communication using Bluetooth, Zigbee or WiFi radio frequency technologies.

NFC inductive data transmissions are half duplex as the same center frequency is used for both transmit and receive. To prevent two devices transmitting at the same time, they operate in what is termed a listen before talk protocol. The devices may only transmit if they previously listen to check that no other devices are transmitting. This anti-collision protocol is a conditional function of IC's that conform to ECMA 340, it also allows multiple target devices to communicate with a single initiator.

There are three principle manufacturers of NFC integrated circuits. Two of the companies Sony, (Japan) and Phillips (which is now NXP Austria and Netherlands) were to applicant's knowledge the principle creators of the NFC technology. A third company, Inside Secure (France) has also created a line of IC's that are compliant with the Near Field Communication (NFC) standards.

The existing NFC standards and product utilise the principle of encoded ASK (amplitude shift keying) inductive load modulation that provides data transmission rates up to 848 Kbits/s. A second modulation technique using PSK (phase shift keying), which is currently unsupported by the NFC standard, allows data rates of up to 6.78 Mbit/s.

Many of the data requirements of soldier system electronic devices can be supported by a 848 Kbits/s data rate. The streaming of high resolution video from day time video cameras, night sights or thermal cameras to a handheld device will require Very High Data Rate (VHDR) NFC. A raw video data stream uses large amounts of data especially in full colour large format displays, for example a 320×240 pixel, 24 bit true color depth, 30 frames a second video requires a throughput of 13.8 Mbit/s or at 15 frames per second a data rate of 6.9 Mbit/s. Raw video data streaming is therefore not compatible with low data rate NFC technology. However with video compression algorithms, the data requirements fall into the top end of the existing low data rate NFC throughput and well within that of future VHDR NFC technology. As an example video compression suitable for wireless application could be either MPEG-4 or H.264. The H.264 video format has a very broad application range that covers all forms of digital compressed video from low bit-rate Internet streaming applications to HDTV broadcast and Digital Cinema applications with nearly lossless coding.

Applicable H.264 video data bit rate for three example display resolutions in the High Profile mode would be: 320×240 pixels@15 frames per sec requires 480 Kbits/sec; 352×288 pixels @30 fps requires 2.5 MBits/s and, 780×480 pixels at 15 fps requires 5 MBits/s all data rates well within the 6.78 Mbit/s capability of VHDR NFC.

Due to the many locations relative to the torso that a hand held or data device may be located and the variations in the size and shape of the devices themselves, the transmit and receive antennas for either the primary or secondary inductive data circuits may be planar (2D), 2.5D or a three dimensional (3D) orthogonal antenna. Coil geometry for either the primary or secondary inductive data coil would preferably be a 3D coil (FIG. 7) so that conditions are optimised for signal reception between the transmitting and receiving coils when they are in any orientation relative to each other. This coil geometry is often used in RFID communication. The coils may be constructed from any of the multitude of rigid or conformal antenna technologies available including air backed, ferrite backed, ferrite rod and ferrite core. The ferrite can be of a simple round planar design or utilise more complex 2.5D or 3D geometries such as those based on dogbone, rod, cubic, ring or spherical forms et cetera. depending on the shape of the magnetic field desired. The ultimate range of the inductive communications becomes a function of the transmitted power, antenna diameter or configuration and the Q factor of the coupled antennas.

There are several intrinsic benefits to using inductive data transfer especially using the NFC format that make it appropriate for use in communicating with hand held electronic devices.

NFC communication protocols require the instant pairing of devices such that once they are brought within a very short range of each other such as <10 cm, they instantly pair without manual intervention. The moment a hand held device is placed in a modular pocket secured to the outside of an armor plate pocket, it will automatically connect to the primary power and data node on the armor plate and through to the soldier system.

The short range attributes of inductive or NFC makes it extremely difficult to intercept by someone trying to electronically eavesdrop as would easily be the case with short range communication using Bluetooth, Zigbee, WiFi or other radiating radio frequency technologies. When an NFC device is coupled to a primary inductive data circuit on an armour plate, the wireless connection can be considered to be secure as the antennas are proximally intimate and will be magnetically tightly coupled. As further protection from eavesdropping two additional protective methods are available. The establishment of a secure channel over NFC can be done very easily, because the NFC link is not susceptible to a Man-in-the-Middle attack. Therefore, well known and easy to apply key agreement techniques without authentication can be used to provide a standard secure channel. This resistance against Man-in-the-Middle attacks makes NFC an ideal method for secure pairing of devices placed on the soldier. Another standard that NFC IC's must adhere to is the ECMA-386 NFC-SEC-01 Cryptographic Standard which provides for the implementation of both 128 and 196 bit encryption using one of several specified methodologies. Encrypted data transmission is a very common requirement for military devices to ensure secure communication.

A further benefit of inductive communication is that because it applies the principles of a modulating magnetic field, on body devices would still be able to communicate between themselves and to the soldier system when the soldier enters an area or zone that is being subjected to RF jamming, where the RF jamming is being used to provide protection from the detonation of for example roadside IED's (Improvised Explosive Device) or for other tactical reasons.

In my prior inductively coupled power and data transfer systems such as described in my published patent applications and patent mentioned above, one concern has always been stabilizing the device with its secondary coil in close adjacency aligned over the primary coil so as to allow efficient inductive coupling between the primary and secondary coils for a sufficiently long time to provide for the required power transfer to the secondary coil and for the desired data transfer between the coils, wherein by reference to primary coils I intend to cover both the case where data is transferred from the same coil as the power, and the case where the data is transferred from a separate data coil and the power is transferred from a separate power coil, collectively then both referred to as the primary coil. One solution to the stability problem is for example to use a rigid pocket insert to stabilize the hand-held device in the pocket for the inductive coupling, wherein the primary coil is mounted in the rigid insert for inductive coupling with the secondary coil in the hand-held device. In the present application it is important to note that, rather than relying on a rigid pocket insert I am using the hard armor plate as a stabilizing foundation or structure. Up till now the device pocket in my published patent applications and patent mentioned above was not a stable footing but rather merely formed part of what would often be a flexible fabric tactical garment. The use of the armor plate worn in the tactical garment, for example in a tactical body armor vest, provides a foundation which I now take advantage of. The foundation of the armor plate assists in substantially doing away with the need for an alignment insert in the device pocket as, once the pocket is attached to the outer surface of the garment adjacent the strike face of the plate, for example to the outer surface of the plate pocket in those garments where the plate pocket is outermost on the garment, so long as the device pocket is snug around the hand-held device, sufficient stability is often achieved without further structure in or around the device pocket. Thus for example the device pocket could be made of fabric or resilient plastics or foam which are shaped to conform to the hand-held device exterior, thereby enabling one-handed insertion and removal of the hand-held device from the device pocket, where the device pocket is resilient and therefore may be crushed and will re-form without the concern that an insert within the device pocket may be damaged upon such crushing of the device pocket.

DETAILED DESCRIPTION WITH REFERENCE TO FIGURES

Figure 1:
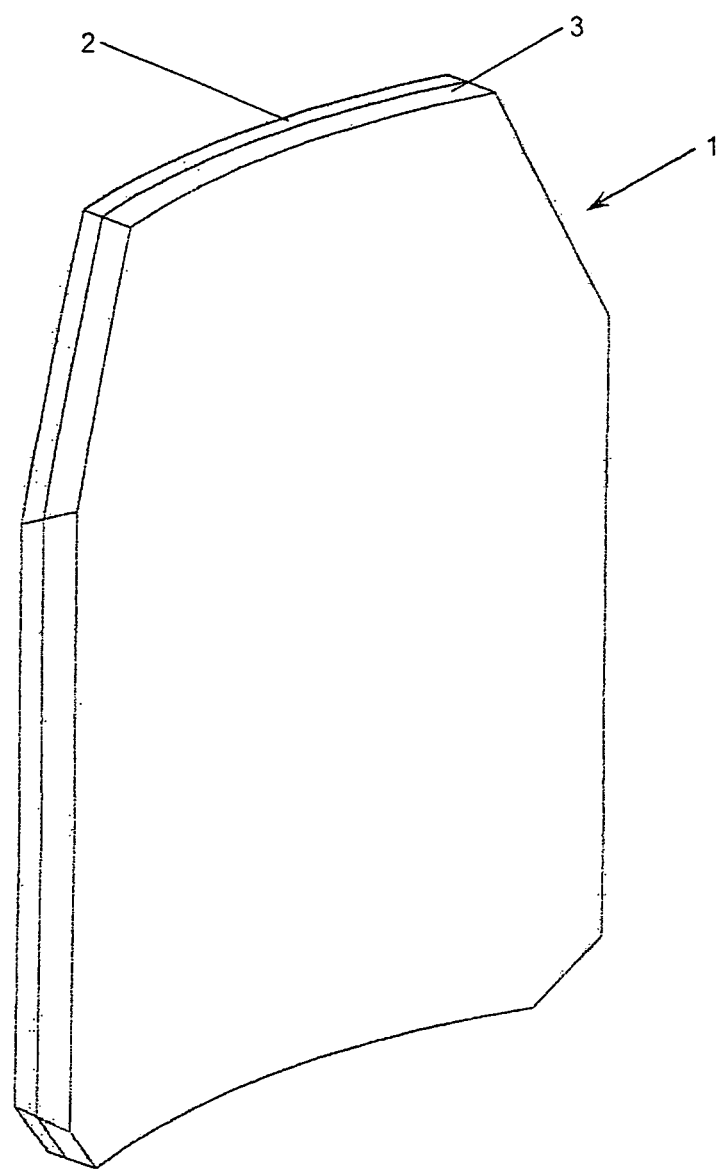
FIG. 1 shows components of a single curved hard armour plate, a monolithic ceramic strike face and composite backing. Not shown are other materials often used in the construction of the plate such as rubber edging, foam layers, carbon fibre strips or layers, plastic layers such as polycarbonate or Lexan and the outer cover which is usually a heavy nylon fabric that is adhesive bonded to the plate. The plate illustrated is a rectangular plate with a simple curve and rifle cut-outs on the upper corners to allow proper shouldering of a weapon. Plates can also be rectangular, oval or irregular shapes that have complex surface profiles.

As seen in the drawings wherein like reference numerals denote corresponding parts in each view, the composition of a personal hard armor plate 1 as shown in FIG. 1 for use on the front, rear, side, shoulder or other location on the soldier is typically constructed with a ceramic strike face 2 supported by a composite backing 3 and is then covered with a variety of hard wearing fabric covers or a thin formed plastic shell. The plate ceramic strike face 2 is an excellent structure on which to place primary inductive power and data nodes. The inductive nodes provide wireless power and data to devices mounted in pockets on the front of the plate pocket of the tactical garment that is being worn by the soldier and into which the armor plate is inserted. In a similar fashion a lower ballistic performance composite plate without a ceramic strike face can also be used as the plate structure on which to integrate the inductive nodes. As depicted in FIG. 2 one or multiple primary inductive power and data nodes 16 can be distributed on the ceramic strike surface 2 of the hard armor plate 1. When multiple nodes are integrated onto the plate 4, a common bus 10 for both power and data connects the nodes to a single quick-connection point 11 located on the edge of the plate. It may be found desirable that instead of fixing the plate connector to the edge of the plate, the connector can be placed on a wire pigtail that can exit the plate at any point. The plate connection point 11 provides connection of the inductive power and data nodes to the soldier system bus such as SMBus or I²C Bus for data communication with the central soldier system computer, other data devices and central soldier power using a single connector 12. The wiring harness bus 10 between nodes on the plate is both robust because it is placed on a rigid structure, lightweight and has only the one external connection for multiple nodes. The basic elements of each inductive node are the primary power and data driver circuit 5, the planar primary power coil assembly 6 with optional proximity sensor 13 used to detect the placement of a device within a pocket and the inductive data coils or antennas. The inductive data antennas can be of several geometries and orientation. Although only one type of antenna type would typically be used per node, shown in FIG. 2 are a horizontal ferrite rod with coil 7, vertical ferrite rod with coil 8 and a planar coil 9. The inductive nodes would be adhered to and embedded in a protective layer on the strike surface of the plate before the plates outer cover is placed over the nodes and ceramic strike face.

FIG. 3 is a cross-section view of a hard armor plate assembly 41 showing an integrated inductive power and data node. The section view shows the ceramic strike face 2 with a composite backing 3. In some plate designs the composite backing may have integrated into it a conformal rechargeable battery that has the same shape as the plate. To provide clarity to the illustration, the plates outer fabric finishing layer or thin plastic outer cover are not shown. Adhered to the front of the strike face is the inductive power and data primary drive circuit 5, a thin profile planar primary inductive power coil 6 with a ferrite backing 14 and an optional hall effect proximity detector 13 embedded within the center of the primary power coil. The primary data antenna is a horizontal ferrite rod 7. All the inductive node component parts described are embedded or encased in a protective resin 15. The hard armor plate and integrated inductive primary nodes are finished with the previously mentioned fabric cover or plastic case to provide a smoothly finished robust plate that is only a few millimeters thicker than a standard plate.

Figure 4A:
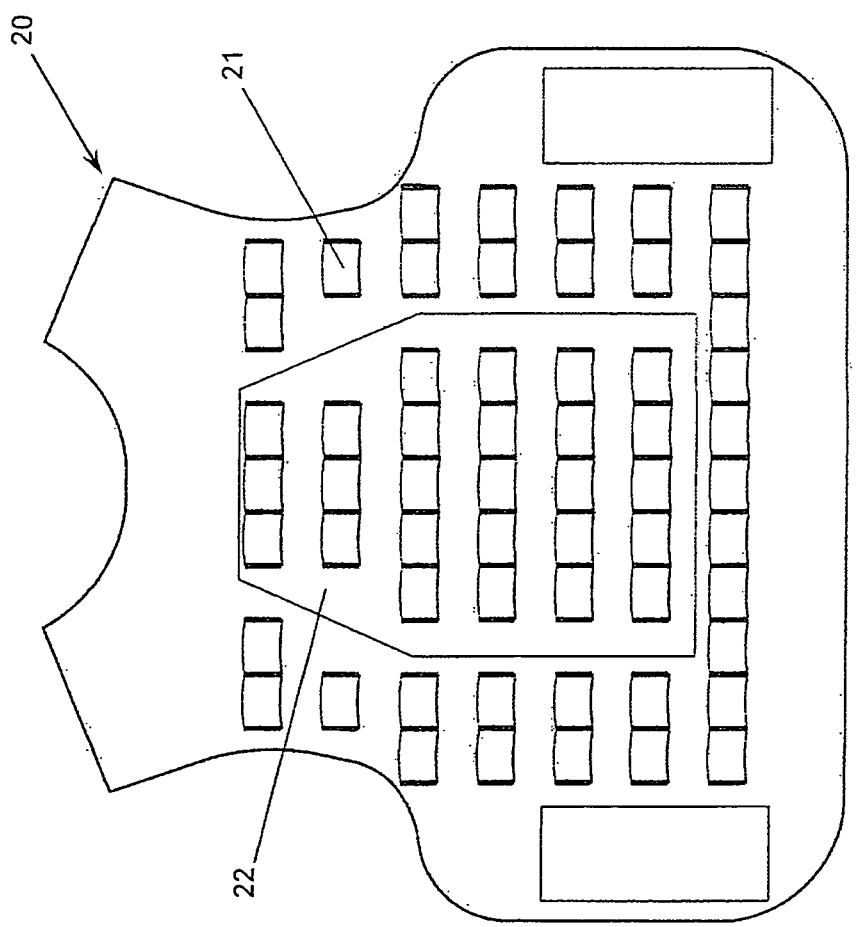
FIG. 4A shows a front outer carrier of a tactical load carriage vest with webbing pocket attachment straps placed across the front of the vest.
Figure 7:
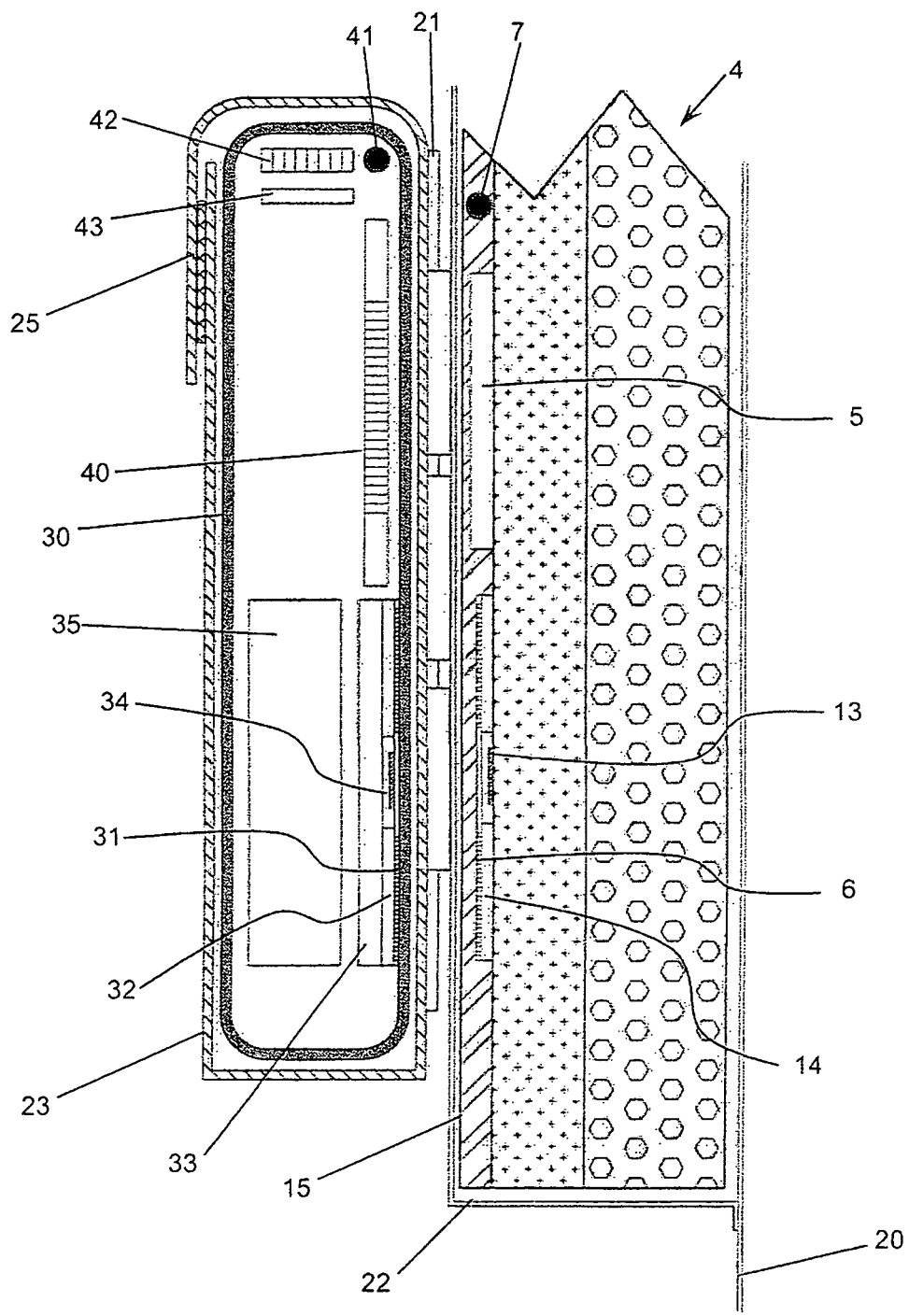
FIG. 7 shows a cross-section detail of modular pocket attached to a vest plate pocket. A ceramic/composite hard armour plate with integrated inductive charging nodes is in the plate pocket. The primary inductive power coil on the plate is co-axially aligned with the secondary inductive power coil packaged within the electronic device. The optional proximity sensor, such as a hall effect sensor is triggered by the magnet embedded centered in the secondary coil within electronic device. An end view of a single primary inductive data antenna in a horizontal orientation can be seen as part of the power and data node on the hard armor plate, while in the electronic device the secondary data antenna is a 3D orthogonal array of inductive ferrite rods with coils, allowing the device to be held in any orientation without losing inductive coupling with the primary inductive data antenna.

A hard armor plate can be placed into several types of garments issued to soldiers, the three most common types of garment are: a tactical or fragmentation vest that has soft armour panels; a tactical load carriage vest that can carry a soldiers fighting order and has no soft armor protection; or a plate carrier, a garment designed primarily to carry front and rear hard armor chest plates. FIG. 4 is an illustration of the front panel of a two piece tactical vest 20 showing MOLLE or PALS webbing 21 that is used to attached individual pockets to the vest. Other systems of attaching modular pockets include hook and loop, hook and loop with flaps, hook and loop with snaps, plastic buckles and straps and other fastening iterations. All of these methods will work with an inductive power and data transmission system. The hard armor plate 4 having inductive nodes 16 as seen in FIG. 4a and shown in outline in FIG. 4 is slipped into the plate pocket 22 on the vest 20 in the same way as a conventional plate without inductive nodes. The pocket is typically a tight fit so that the plate is held securely within the pocket so that it does not move or bounce when a soldier runs. The plate pocket 22 can be of two basic forms, a flush design where the plate is on the inside of the outer shell and protrudes to the inside of the vest, or an external pocket where the plate and pocket protrude to the outside of the outer shell. There are several designs for plate pocket closure with the typical method being a flap with hook and loop fastener. FIG. 5 is a perspective illustration of the font panel of a tactical vest 20, equipped with MOLLE or PALS webbing 21, and an external plate pocket 22 that has been fitted with four modular pockets 23. FIG. 6 shows the hard armor plate 4 with its inductive power and data nodes 16 positioned within the plate pocket 22 of the tactical vest 20. The inductive nodes 16 on the plate are located under the location where each of the modular pockets 23 would be attached and into which would be placed an electronic device 30 such as seen in FIG. 7 with embedded secondary inductive power and data circuits. The plate connection 11 allows the plate to be connected to the soldier system connection point 12 that provides both central power which may be a separate soldier system battery 24, and access to the soldier system data bus. The plate to soldier system connection can be made through a buttonhole or aperture in the plate pocket that provides access to the plate connector, the connector can be positioned at the top of the plate next to the pocket flap or the connector can be placed on a pigtail that can exit at any location on the plate pocket.

The further cross section view of FIG. 7 shows a system comprised of the tactical vest, hard armor plate with inductive power and data node, and a modular pocket with wireless enabled inductive power and data device stowed within the pocket. The tactical vest 20 has sewn onto it a plate pocket 22 with pocket attachment webbing 21, and an attached modular pocket 23 with flap closure 25. A hard armor plate 4 with a primary inductive power and data nodes is in the plate pocket 22, with the section view showing one of the nodes with a modular pocket 23 and an electronic device 30 with secondary power and data inductive circuits inserted into the pocket such that the primary inductive coil 6 and secondary inductive coil 32 are aligned in both the vertical and horizontal axis (not depicted in diagram). Ferrite backings 14, 32 are positioned on the rear of each of the primary and secondary coils to enhance the magnetic coupling between the coils and therefore improve the efficiency of power transfer between the plate and the device. An optional hall effect proximity sensor 13 is shown positioned within the center of primary coil 6, with a magnet hall effect trigger 34 located in the center of the secondary coil 31 within the device 30. AC voltage generated by the primary inductive drive and data circuit 5 is provided to the primary inductive power coil which generates the magnetic field that inductively couples across the air gap, created by the plates protective front layer into which the primary drive and coils are embedded 15, the vests fabric components 21, 22, 23, to the secondary inductive power coil 31 housed within the plastic enclosure of the electronic device 30. The AC voltage produced by the secondary inductive power coil is connected to the secondary inductive charging circuit 33 where the incoming AC power is rectified, regulated and then controlled by the battery charging sub-circuit before the power is passed through to the device rechargeable battery 35. The charge of the device battery is monitored and fed back as a modulated data signal inductively through the primary-secondary inductive power link, or is provided back to the primary circuit through the inductive data circuit. In either event the power level of the device battery can be determined by the soldier system power management system and depending on power levels of the central power system and a devices tactical priority, the power to the primary inductive power circuit can be remotely turned on or off as required by the power management system.

Digital communication data, be it text or numerical data, still or video image, or audio can be transmitted via an inductive coupling using Near Field Communications or NFC. A primary inductive NFC coil or antenna 7 is located in each primary inductive node. Data from the soldier system is provided to the primary inductive power and data drive 5 which encodes, modulates and transmits the data inductively from the primary inductive data antenna 7 to the to the secondary data antennas and receiver/driver circuit. The inductive data stream is received by the secondary inductive antennas which can be configured as a 2D antenna or a 3D antenna. With a 3D antenna in the device, the user of the device is free to hold it in any orientation without losing the inductive data link. A horizontal (x-axis) ferrite rod and coil antenna 41, vertical (y-axis) ferrite rod and coil antenna 40, and z-axis ferrite rod and coil antenna 42 comprise one example of a 3D antenna that could be incorporated into an electronic device. Inductive data signals received by the antennas are passed to the device data receiver/transmitter circuit 43 and then to the device electronics while communicating in a peer to peer mode with the primary data circuit and the soldier system.

Figure 8B:
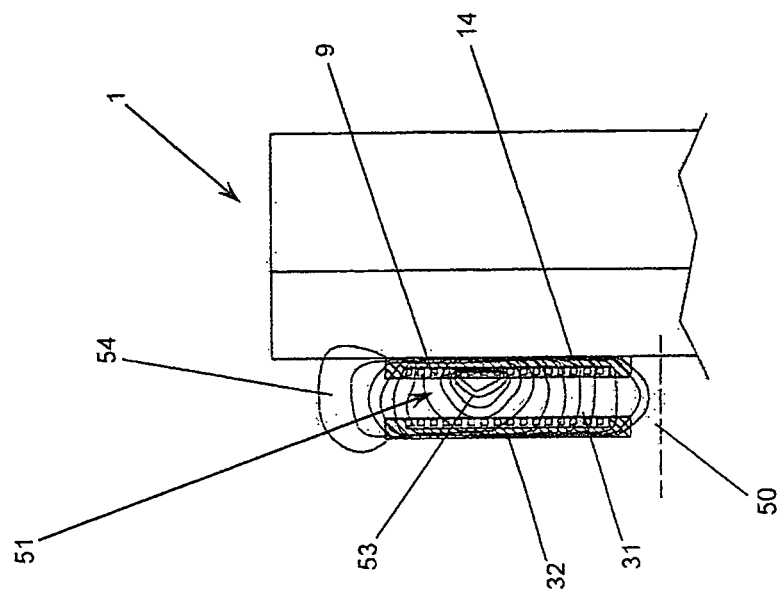
FIGS. 8A, 8B show a cross-section illustration of the upper half of a circular planar air backed primary and secondary planar inductive coils and ferrite backed primary and secondary inductive coils. The magnetic flux lines across the air gap between them is produced by placing an alternating current through the primary coil positioned on the right side in both figures. The air backed coils (FIG. 8A) have a lower coupling efficiency due to flux leakage, the magnetic flux lines whose path is outside the useful or intended magnetic circuit, where the magnetic flux generated in the primary coil does not pass through the secondary coil. The ferrite backed coils (FIG. 8B) have more magnetic flux lines passing through both coils and significantly lower flux leakage with a consequently higher coupling efficiency.
Figure 8A:
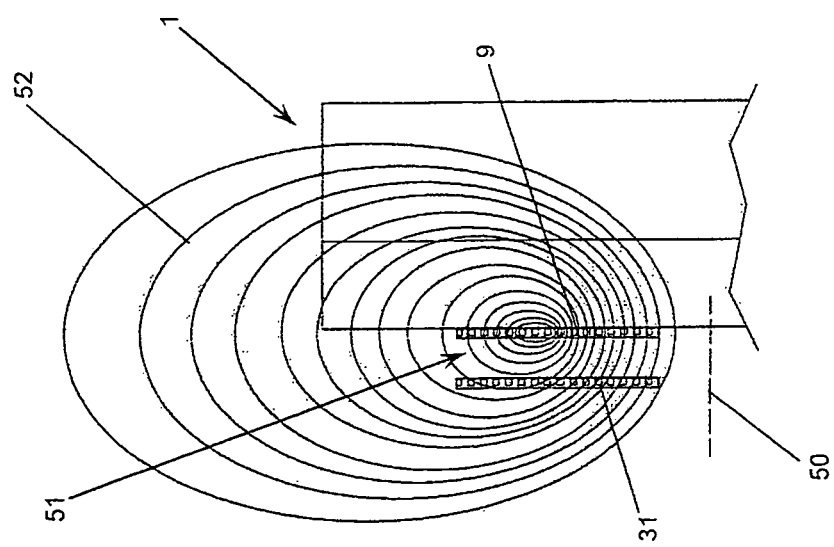

Two air backed inductive coils placed in close proximity to each other with an air gap between and one is energized with an alternating current they will have a low co-efficient of coupling, meaning they will not have an efficient inductive transfer of power between them as too many of the magnetic flux lines emitted from the energized primary coil are not intercepted by the secondary coil. To enhance the coupling between the coils and to therefore improve the efficiency of inductive power transfer, ferrite backings can be placed on the coils to increase the coupling. FIGS. 8A and 8B provide a representative illustration of the magnetic fields produced by an energized inductive primary coil both with and without a planar ferrite backing. FIG. 8A shows the representative magnetic field 52 when the primary coil 9 is energized with an alternating current. The primary coil 9 is shown positioned against a hard armor panel 1 and with the secondary coil 31 on a common axis 50, placed a short distance away. The space between the primary and secondary coils is illustrated as an air gap 51, as the air gap also magnetically represents materials that are non-magnetic and non-conductive such as the fabrics, resins, plastics et cetera used on the face of the hard armor system and in the manufacture of tactical vests and pockets. If we now place a planar ferrite backing 14 behind the primary coil 9 and a planar ferrite backing 32 on the secondary coil 31 as shown in FIG. 8B, the coils become more tightly coupled magnetically and so have a greater inductive coupling. The path of the magnetic field from the primary coil that previously radiated freely into air, is redirected by the ferrites such that the magnetic flux lines becomes concentrated 53 between the two coils with only a small part of stray inductive energy 54 escaping from the outside coil diameter. There are many material compositions and mechanical designs of ferrite backing that may be used on the primary and secondary coils depending on other design constraints and requirements. The ferrite may be of different inside diameter (ID) and outside diameter (OD) than the coil, be a channel design or other common ferrite geometries.

A schematic block diagram of an inductive power and power data transmission system is presented in FIG. 9. DC voltage from a central power source 70 usually within the range of but not limited to 10-28 VDC and provided via the soldier system power and Sambas connector 11, is provided to the primary drive node electronic circuit 16. There are many inductive drive circuits employing both conventional and new circuit topologies that can be used as the principle drive elements for the inductive power circuit. Inductive circuit drive blocks are usually comprised of an oscillator circuit 72 that can contain within it an auto-tune sub circuit 73, the oscillator circuit then feeding the drive frequency into the main drive circuit that may be a half or full bridge driver 74 or other switching circuit that allows an alternating current to be provided to the tuned tank circuit 75 comprised of the primary power coil 9 and tuning capacitors. Soldier central power 70 to the primary driver can be controlled remotely via a power management system (not shown). The primary drive circuit also contains local sensing circuits that only allow full power to the tank circuit if a device is mounted on the outside of the armor panel. Once the primary inductive coil is energized, a magnetic flux field 52 is generated that passes through the air gap 51 that contains the armor panel cover and pocket fabrics and inductively connects with the secondary inductive power coil 31.

Example sensing devices are a proximity sensor 13 such as a hall effect sensor that would be switched by the presence of a proximity trigger 34 such as a magnet embedded within the device within the pocket. Other methods of determining the presence of a secondary inductive circuit include a polling processor 77 in the primary circuit polling or pinging to determine if a device is present by receiving a poll response. In addition to periodic polling, the same modulation technique can be used to transmit device battery power management data using the modulated magnetic flux 52 between the primary 9 and secondary 31 inductive power coils. By using a dedicated interface driver-receiver circuit, data signals superimposed on the power signal can be decoded 77 and passed to the soldier system data bus via the plate connector 11.

When an electronic device with embedded secondary inductive power and data circuit 17 is placed into a pocket, the secondary circuit is sensed either by the proximity sensor, for example a hall effect sensor 13 that is triggered by the magnet sensor trigger 34 within the electronic device, or by the devices polling responder 86 replying to a polling request from the primary polling processor 77. The secondary side of the inductive power and data transmission system is comprised of a secondary power and data receiving coil 31, which may or may not be in a series or parallel tuned circuit. The AC inductive power received by the secondary coil 31 is rectified to DC power 81 and then changed to the appropriate voltage by a voltage regulator circuit 82 before the power is passed to the battery charging circuit 83 and onto the rechargeable battery 84 within the device. Any encoded and modulated data power management requests received by the secondary coil from the primary drive circuit is detected and processed by the polling decoder 86 which queries the batter power level processor 85 before replying back to the primary circuit. Low level power or other data streams for example, less than 20 kBPs can be fed back from the device through the data driver 86, which contains an oscillator/modulator block, low power bridge driver or equivalent switching circuit topology and then to the secondary coil 31 that provides the inductive data transmission 52 to the primary coil 9, with the data received by the polling and power data processor 77, the data is passed out from the primary inductive node 16 to the SMBus data and power connector 11 and the soldier system power management system. The above discussion is not intended to be limiting as there are multiple ways to implement variations of the above circuit, from the most rudimentary where the primary circuit is turned on only by the proximity sensor or polling processor to more sophisticated implementations by the power manager.

Figure 10:
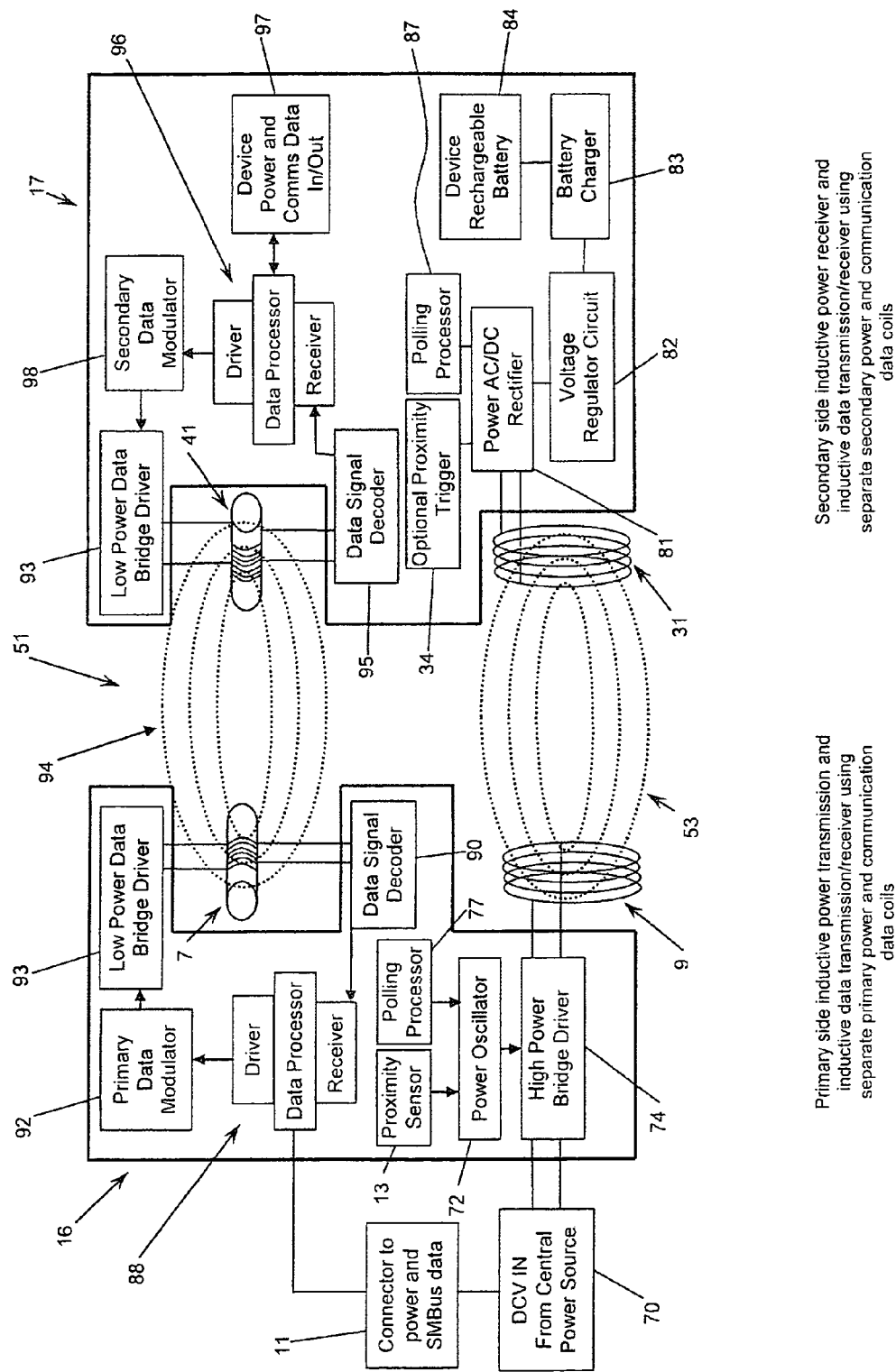
FIG. 10 show a simplified schematic block diagram showing inductive power and data transmission using separate power and data coils on each of the primary and secondary sides.

FIG. 10 shows a schematic block diagram of an inductive power and data transmission system where the inductive power and inductive data are transmitted over dedicated power and data primary and secondary inductive coils. DC voltage from the soldier system central power source 70, usually within the range of but not limited to 10-28 VDC, is provided to the primary drive electronic circuit 16, via the hard armor plate/soldier system connection 11. There are many inductive drive circuits employing both conventional and new circuit topologies that can be used as principle drive elements for the inductive power circuit. Base blocks are usually comprised of an oscillator circuit 72 that can contain within them an auto-tune sub circuit, the oscillator circuit then feeding the drive frequency into the main drive circuit that may be a half or full bridge driver 74 or other switching circuit that allows an alternating current to be provided to the tuned tank circuit comprised of the primary power coil 9 and tuning capacitors. Central soldier power 70 to the primary power and data drive circuit can be switched manually from the soldier power manager or it may switch the circuit on automatically dependent on the priority of the device to be charged, overall power levels of other devices, the power level of the central power supply and the tactical scenario in which the soldier is engaged. In addition the primary drive circuit can also contain sensing sub-circuits that only allow full power to the tank circuit if a device is placed within the outer modular pocket. Once the primary inductive coil is activated, a magnetic flux field 53 is generated that passes across the air gap 51 between the hard armor plate and the device within the pocket and inductively connects with the secondary inductive power coil 31 contained within the device.

As described for the data over power inductive circuit, the presence of the secondary inductive power and data circuit 17 can be sensed by the primary circuit using proximity sensors 13 such as a hall effect sensor in the primary and a sensor trigger 34 or for a hall effect sensor, a magnet located within the base plate of the external device or, a polling process can be implanted that employs a polling processor 77 in the primary drive with a respondent polling processor 87 in the secondary. Alternately, with a system utilising separate inductive power and data transmission circuits, the NFC inductive data system can perform a handshake identification of the secondary device that allows the continuous provision of power to the primary circuit and consequently to the secondary circuit within the device and also initiates the ability of the NFC system to communicate data.

When the electronic device containing the secondary inductive power and data circuit is placed in a pocket on the outside of the armor plate and power is applied to the primary circuit, the secondary circuit may be sensed either by the proximity sensor being triggered by the device, by the device responding to a polling request or by NFC data exchange. Once it is established that the device is present and the primary power circuit is energized, the secondary side of the inductive power transmission system comprised of the secondary inductive power coil 31, which may or may not be in a series or parallel tuned circuit begins to receive continuous power. The AC inductive power received by the inductive secondary coil 31 is rectified to DC power 81 and then changed to the appropriate voltage by a voltage regulator circuit 82 before the power is passed to the battery charger circuit 83 and then to the rechargeable battery 84.

The inductive data circuit functions as a separate entity from the inductive power circuit except for polling requests that may be made between them. Data exchange from the soldier system data bus to the plate connector 11 by the inductive data processor block 88, which as previously discussed can be architecture such as NFC. The processor block 88 encodes the data which is modulated 92 and passed to a low power data bridge driver 93 that transmits the data inductively via the primary data coil or antenna 7 via the magnetic field 94 that communicates through the air gap 51 between the hard armor plate and the device within the pocket to the secondary inductive data coil or antenna 41. The data is received by a data signal decoder 95, converted and processed 96 before being transferred to the device interface electronics 97 on a peer to peer basis. This architecture will allow half duplex data rate exchanges of up to 848 kbps with first generation commercial devices and up to 6.78 MBps with second generation devices. The return of data from the device to the primary node on the plate follows the reverse process. Data from the device interface electronics 97 are passed to the inductive data processor block 96, which encodes and modulates 98 the NFC signal and generates the magnetic field using for example a low power data bridge driver 93 transmitting the data inductively via the secondary data coil or antenna 41 via the magnetic field 94 that communicates through the air gap 51 with the primary inductive data coil or antenna 7. The data is received by a data signal decoder 90, converted and processed 88 before being transferred to the soldier system data bus 11 on a peer to peer basis.

The design and function of some external devices may require separate transmission data and control channels. In this case two data circuits and respective coil assemblies can be incorporated into the primary drive circuit and external device. To ensure there is no cross-talk or interference between data channels the data streams can be encoded, modulated differently, use a different operating frequency or be separated sufficient physically that the two magnetic data fields can operate without interference.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for the inductive transmission of power from a primary coil and its associated primary circuits to a secondary coil and its associated secondary circuits, and for the inductive transmission of data between the primary and secondary coils and their associated circuits, wherein the primary coil and associated primary circuits are mounted in cooperation with a tactical garment having a hard body-armor plate, the system comprising:

A hard body-armor plate having a strike-face and an opposite rear face and which is non-magnetic and non-electrically conductive to at least a first depth behind said strike-face, and wherein said plate is mountable to or into said garment so that, when so mounted, said strike-face faces away from a user wearing said garment and said rear face faces towards the user wearing said garment, wherein said primary circuits are mounted embedded in said plate, and wherein said primary coil is embedded in said plate behind said strike-face a substantially uniform said first depth, and wherein said primary circuits are adapted to be electrically connected to a central power source carried on or in cooperation with said garment, a device pocket for an electronic hand-held device wherein said device pocket is mountable to an outer surface of said garment so as to be in an inductively coupling position aligned over said primary coil in said plate to thereby align said secondary coil of said hand-held device, when in said device pocket, over and into inductively coupled registry with said primary coil and wherein said pocket maintains said secondary coil at a substantially uniform second distance off said outer surface of said garment, and wherein the sum of said first depth and said second distance is an air-gap equivalent in the range of substantially one to ten millimeters for the inductively coupled transfer of power and data across said air-gap equivalent.

2. The system of claim 1 wherein each said primary coil is a single coil for both said transfer of power and data.

3. The system of claim 2 wherein a plurality of said each primary coil are distributed over said strike-face and wherein said each primary coil is electrically connected in cooperation with said primary circuits.

4. The system of claim 1 wherein each said primary coil is a pair of coils wherein one coil of said pair is for said transfer of power and the other coil of said pair is for said transfer of data.

5. The system of claim 4 wherein a plurality of said each primary coil are distributed over said strike-face and wherein said each primary coil is electrically connected in cooperation with said primary circuits.

6. The system of claim 1 wherein said device pocket is adapted and sized to snugly receive the hand held device therein for secure positioning of said secondary coil in said inductively coupling position.

7. The system of claim 6 wherein said primary coil is a plurality of primary coils which include power and data nodes.

8. The system of claim 7 wherein said power coils are the substantially planar coils and wherein said data coils are substantially rods.

9. The system of claim 6 wherein said garment includes a plate pocket on at least a front of the garment, and wherein said primary coil is a plurality of primary coils and said device pocket includes a plurality of device pockets mountable on to an outer surface of said plate pocket.

10. The system of claim 9 further comprising a soldier system network on said garment wherein said plate has a hard-wired connection to said soldier system network for the exchange of power and data between said plate and said network.

11. The system of claim 10 wherein said network includes a common network bus, a processor and a central power supply.

12. The system of claim 11 wherein said central power supply is a central battery and wherein said processor communicates with said primary circuits and is adapted to provide power management for the controlled transfer of power to said hand-held devices when in said device pockets, so that as a charge of said central battery depletes, power is only transferred to the hand held devices having a higher tactical priority as determined by said processor.

13. The system of claim 12 wherein each said hand-held device has its own re-chargeable power supply which is charged by said inductive transfer of power thereby providing for hot swapping out of said central power supply without power interruption to said each hand-held device when in said device pockets.

14. The system of claim 13 wherein said each hand-held device provides a modulated signal via said inductive coupling of said primary and secondary coils indicating the corresponding charge level of a corresponding said rechargeable power supply in a hand-held device of said each hand-held device.

15. The system of claim 14 wherein said signal is transmitted via a modulated signal inductively transmitted through an inductively coupled power coupling of said primary and secondary coils.

16. The system of claim 14 wherein said signal is transmitted via a modulated signal inductively transmitted through an inductively coupled data coupling of said primary and secondary coils.

17. The system of claim 10 wherein said plate includes a common plate bus embedded in said plate and connecting said plurality of primary coils and said primary circuits to said hard-wired connection.

18. The system of claim 9 further comprising a central power supply mounted on said garment in said electrical connection to said primary circuits.

19. The system of claim 9 further comprising a central power supply mounted on said plate in said electrical connection to said primary circuits.

20. The system of claim 19 wherein said central power supply is a conformally shaped battery shaped so as to substantially conform to said rear surface of said plate.

21. The system of claim 1 further comprising a proximity sensor in said device pocket to detect proximity of a hand-held device in said device pocket.

* * * * *